US012638563B2

(12) United States Patent
Jain et al.

(10) Patent No.: US 12,638,563 B2
(45) Date of Patent: *May 26, 2026

(54) METHODS AND RELATED SYSTEMS FOR DETECTING MISCALIBRATION OF EXTRINSIC LIDAR PARAMETERS

(71) Applicant: VELODYNE LIDAR USA, INC., San Jose, CA (US)

(72) Inventors: Vishal Jain, Walnut Creek, CA (US); Sharath Raveendran Nair, San Jose, CA (US); Yaohua Xu, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 1134 days.

This patent is subject to a terminal disclaimer.

(21) Appl. No.: 17/561,380

(22) Filed: Dec. 23, 2021

(65) Prior Publication Data

US 2023/0204737 A1 Jun. 29, 2023

(51) Int. Cl.
*G01S 7/497* (2006.01)
*G01S 7/481* (2006.01)
(Continued)

(52) U.S. Cl.
CPC ............. *G01S 7/497* (2013.01); *G01S 7/4817* (2013.01); *G01S 17/89* (2013.01); *G01S 17/931* (2020.01)

(58) Field of Classification Search
CPC ........ G01S 7/497; G01S 17/931; G01S 17/89; G01S 7/4817; G01S 7/4972; G01S 17/42; G01S 17/88

(Continued)

(56) References Cited

U.S. PATENT DOCUMENTS

2019/0094981 A1 3/2019 Bradski et al.
2019/0212450 A1* 7/2019 Steinberg .............. G01S 7/4863
(Continued)

FOREIGN PATENT DOCUMENTS

WO 2020126123 A2 6/2020

OTHER PUBLICATIONS

U.S. Appl. No. 17/710,956, filed Mar. 31, 2022. (Year: 2022).*
(Continued)

*Primary Examiner* — Michael P Nghiem
(74) *Attorney, Agent, or Firm* — Kilpatrick Townsend & Stockton LLP

(57) ABSTRACT

Systems and methods for detecting extrinsic parameter miscalibration for light detection and ranging ("LiDAR") devices are disclosed. According to one embodiment, a LiDAR detection method includes scanning, by a LiDAR system comprising one or more LiDAR devices, a field-of-view during one or more time periods, wherein the LiDAR system moves along a non-linear path during at least a subset of the one or more time periods. Return signal data obtained during at least the subset is aggregated and fiducial markers represented by the aggregated return signal data are identified. Each of the identified fiducial markers are compared to a respective reference fiducial marker of a plurality of reference fiducial markers. Based on the comparison, miscalibration of an extrinsic parameter associated with a position and/or an orientation of at least one of the LiDAR devices is detected. An action is initiated to remediate the detected miscalibration of the extrinsic parameter.

22 Claims, 17 Drawing Sheets

(51) Int. Cl.

| | |
|---|---|
| *G01S 17/42* | (2006.01) |
| *G01S 17/88* | (2006.01) |
| *G01S 17/89* | (2020.01) |
| *G01S 17/931* | (2020.01) |

(58) Field of Classification Search
USPC ........................................................ 702/85
See application file for complete search history.

(56) References Cited

U.S. PATENT DOCUMENTS

| | | | | |
|---|---|---|---|---|
| 2019/0361126 | A1 | 11/2019 | Abari et al. | |
| 2020/0065583 | A1 | 2/2020 | Loveland et al. | |
| 2020/0200872 | A1 | 6/2020 | Böckem et al. | |
| 2020/0353878 | A1 | 11/2020 | Briggs | |
| 2021/0325520 | A1* | 10/2021 | Cai ......................... | B32B 33/00 |
| 2022/0050191 | A1* | 2/2022 | Zhu ......................... | G01S 17/42 |
| 2022/0326763 | A1* | 10/2022 | Rekow .................... | G06F 3/012 |
| 2023/0194684 | A1* | 6/2023 | Wang ..................... | G01S 17/89 |
| | | | | 356/4.01 |
| 2023/0204737 | A1 | 6/2023 | Jain et al. | |

OTHER PUBLICATIONS

PCT/US2022/022961, "International Search Report and the Written Opinion", Sep. 2, 2022, 14 pages.
U.S. Appl. No. 17/710,956, "Restriction Requirement", mailed May 19, 2025, 5 pages.
U.S. Appl. No. 17/710,956, "Non-Final Office Action", Aug. 6, 2025, 20 pages.
U.S. Appl. No. 17/710,956, "Notice of Allowance", Dec. 4, 2025, 7 pages.

\* cited by examiner

250

Original Orientation 402

Changed Orientation (Yaw) 404

Original Orientation <u>406</u>

Changed Orientation (Pitch) <u>408</u>

Original Position <u>410</u>

Changed Position (Translation) <u>410</u>

500

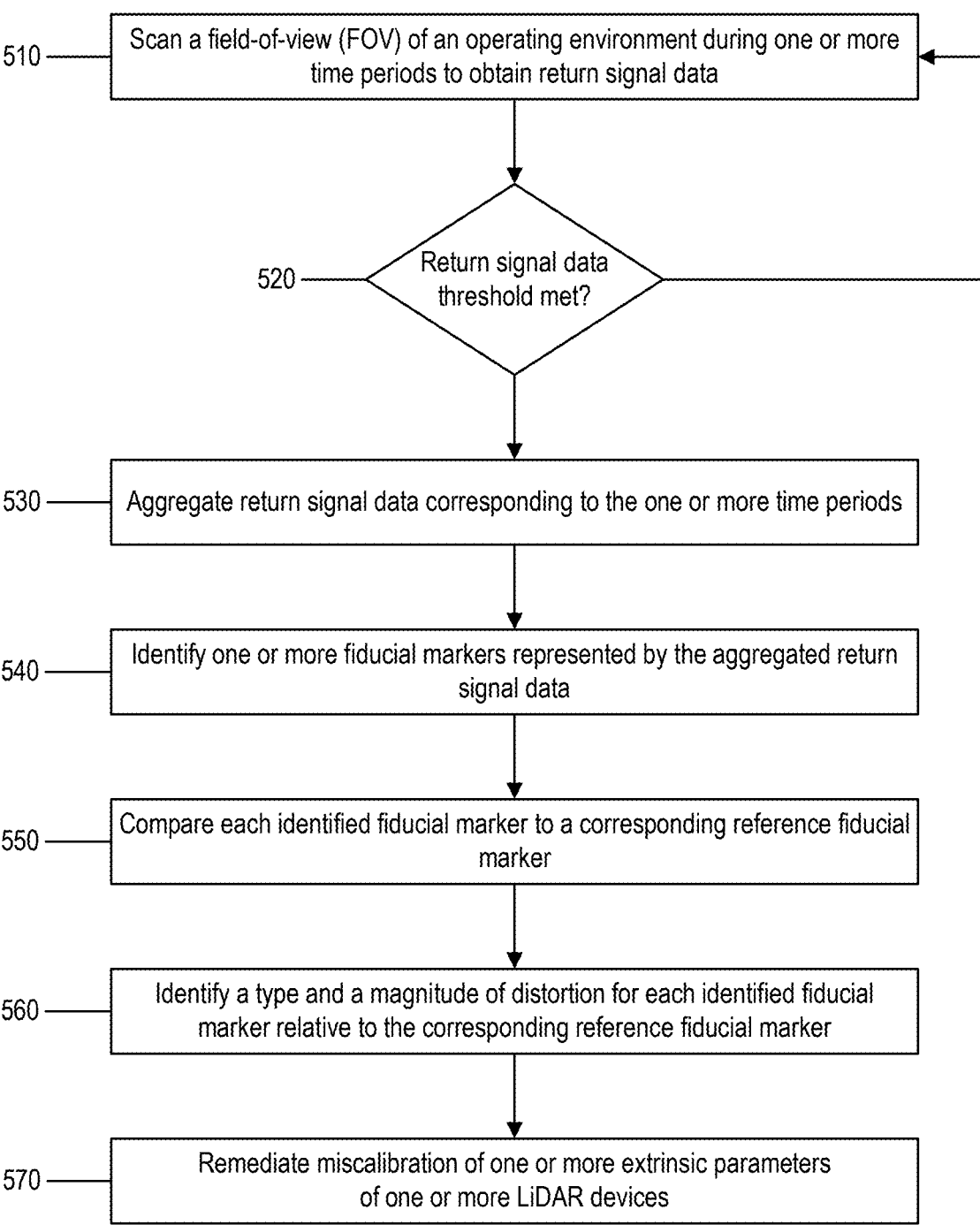

510 —— Scan a field-of-view (FOV) of an operating environment during one or more time periods to obtain return signal data 520 —— Return signal data threshold met?

530 —— Aggregate return signal data corresponding to the one or more time periods 540 —— Identify one or more fiducial markers represented by the aggregated return signal data 550 —— Compare each identified fiducial marker to a corresponding reference fiducial marker 560 —— Identify a type and a magnitude of distortion for each identified fiducial marker relative to the corresponding reference fiducial marker 570 —— Remediate miscalibration of one or more extrinsic parameters of one or more LiDAR devices

METHODS AND RELATED SYSTEMS FOR DETECTING MISCALIBRATION OF EXTRINSIC LIDAR PARAMETERS

FIELD OF TECHNOLOGY

The present disclosure relates generally to light detection and ranging ("LiDAR") technology and, more specifically, to techniques for detecting and/or remediating extrinsic parameter miscalibration in LiDAR systems.

BACKGROUND

Light detection and ranging ("LiDAR") systems measure the attributes of their surrounding environments (e.g., shape of a target, contour of a target, distance to a target, etc.) by illuminating the target with light (e.g., laser light) and measuring the reflected light with sensors. Differences in laser return times and/or wavelengths can then be used to make digital, three-dimensional ("3D") representations of a surrounding environment. LiDAR technology may be used in various applications including autonomous vehicles, advanced driver assistance systems, mapping, security, surveying, robotics, geology and soil science, agriculture, and unmanned aerial vehicles, airborne obstacle detection (e.g., obstacle detection systems for aircraft), etc. Depending on the application and associated field of view, multiple channels or laser beams may be used to produce images in a desired resolution. A LiDAR system with greater numbers of channels can generally generate larger numbers of pixels.

In a multi-channel LiDAR device, optical transmitters are paired with optical receivers to form multiple "channels." In operation, each channel's transmitter emits an optical signal (e.g., laser) into the device's environment, and the channel's receiver detects the portion of the signal that is reflected back to the channel by the surrounding environment. In this way, each channel provides "point" measurements of the environment, which can be aggregated with the point measurements provided by the other channel(s) to form a "point cloud" of measurements of the environment.

The measurements collected by a LiDAR channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal (s) reflected by the surface.

In some cases, LiDAR measurements may be used to determine the reflectance of the surface that reflects an optical signal. The reflectance of a surface may be determined based on the intensity on the return signal, which generally depends not only on the reflectance of the surface but also on the range to the surface, the emitted signal's glancing angle with respect to the surface, the power level of the channel's transmitter, the alignment of the channel's transmitter and receiver, and other factors.

In some instances, based on the distance measurements, a LiDAR system may determine 3D representations of the surrounding environment, where a particular 3D representation may include identifiable objects and surfaces of the surrounding environment. To determine 3D representations of the surrounding environment, a particular LiDAR system may be configured with intrinsic and extrinsic parameters corresponding to one or more LiDAR channels/devices. Intrinsic parameters may be parameters associated with the internal operation of a particular LiDAR device and may be configured independent from external environmental factors. Alternately, extrinsic parameters may be parameters associated with operation of a particular LiDAR device that are dependent on external environmental factors, including, for example, positioning and orientation of a particular LiDAR device relative to external frames of reference. A change in a position of a LiDAR device may be defined as a translation of a LiDAR device along x-, y-, and/or z-axes (or any other suitable coordinate system). A change in an orientation of a LiDAR device may be defined as a rotation of a LiDAR device along x-, y-, and/or z-axes (or any other suitable coordinate system).

In some instances, intrinsic and/or extrinsic parameters may be calibrated during a calibration process prior to usage of a LiDAR device in an application or apparatus. Calibration processes may include static, offline calibration processes that often occur during manufacturing of a LiDAR device or during integration of a LiDAR device into an application to initially configure intrinsic and extrinsic parameters. In some instances, during operation of a LiDAR device, a LiDAR device's extrinsic parameters may benefit from recalibration to account for changes in the LiDAR device's position or orientation relative to the surrounding environment (e.g., relative to an system that includes the LiDAR device). Without such recalibration, the LiDAR device may provide an inaccurate representation of the surrounding environment, which can negatively impact the performance of downstream applications and systems that use data produced by the LiDAR device, such as autonomous navigation systems. Conventional techniques for detecting miscalibration of extrinsic parameters can involve taking the LiDAR device (and/or its associated system) offline for testing. However, operators of LiDAR devices may be reluctant to perform such offline testing frequently, because such testing may be time-consuming and costly. Thus, there is a need for techniques for detecting miscalibration of extrinsic parameters of a LiDAR device without taking the device offline (e.g., while the device remains in operation), so that remedial actions can be promptly initiated.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are LiDAR systems configured to dynamically detect extrinsic parameter miscalibration, and related methods and apparatus. According to one embodiment, a light detection and ranging (LiDAR) detection method includes scanning, by a LiDAR system comprising one or more LiDAR devices, a field-of-view during one or more time periods, wherein the LiDAR system moves along a non-linear path during at least a subset of the one or more time periods. The method further includes aggregating return signal data obtained during at least the subset of the one or more time periods. The method further includes identifying one or more fiducial markers represented by the aggregated return signal data. The method further includes comparing each of the identified fiducial markers to a respective reference fiducial marker of a plurality of reference fiducial markers. The method further includes detecting, based on the comparison, miscalibration of an extrinsic parameter associated with a position and/or an orientation of at least one of the one or more LiDAR devices. The method further includes initiating an action to remediate the detected miscalibration of the extrinsic parameter.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

FIG. 5 shows a flow chart of a method of detecting miscalibration of extrinsic LiDAR parameters, in accordance with some embodiments.

Figure 1:
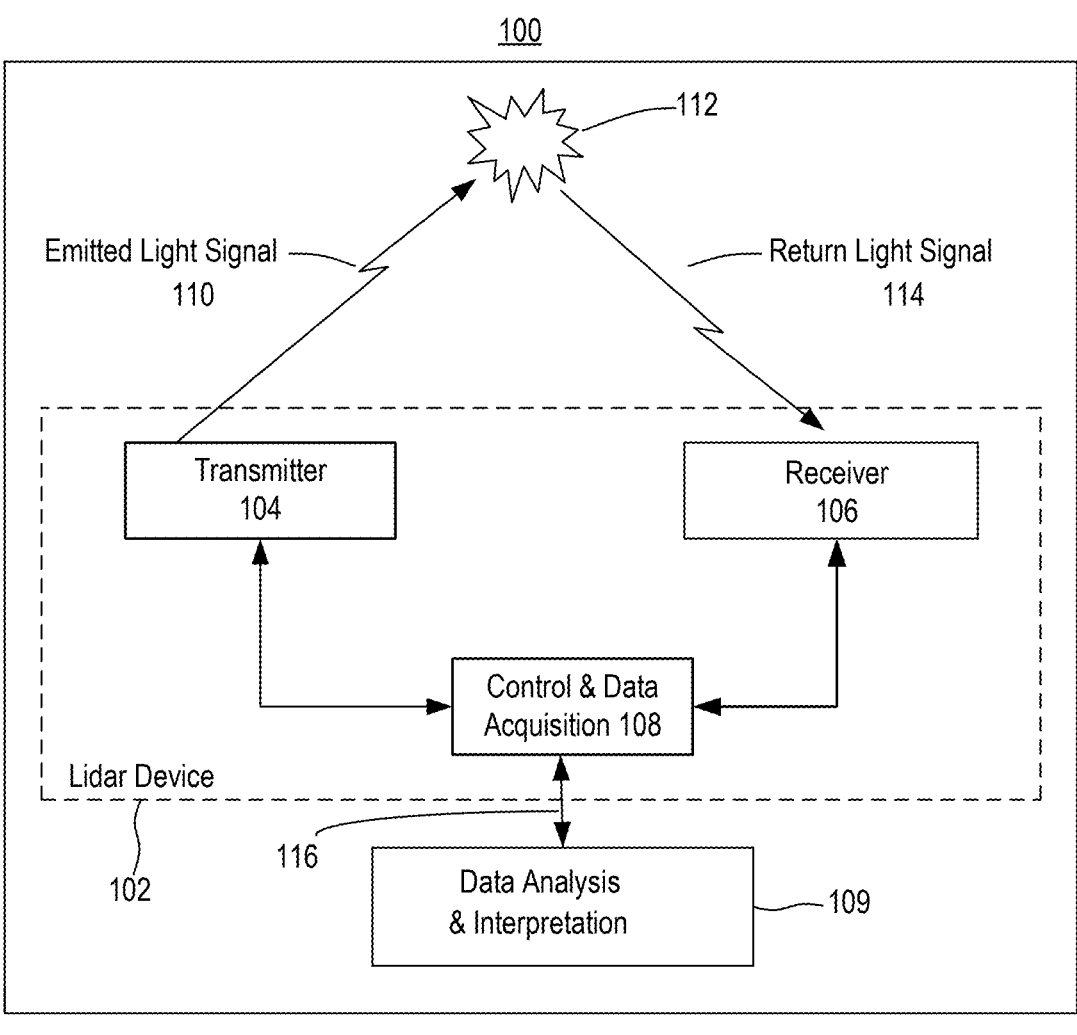
FIG. 1 shows an illustration of an exemplary LiDAR system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for detection and/or remediation of extrinsic parameter miscalibration in a LiDAR device (e.g., due to changes in a position and/or an orientation of the LiDAR device) are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Motivation for and Benefits of Some Embodiments

Multi-channel LiDAR devices may be capable of scanning a field of view (FOV) to generate 3D representations of a surrounding environment. To generate 3D representations of the surrounding environment, each channel's transmitter emits an optical (e.g., laser) illumination signal into the device's environment and each channel's receiver detects the portion of the return signal that is reflected back to the receiver by the surrounding environment, such that each channel provides "point" measurements of the environment. Each point measurement may represent a "pixel" of the surrounding environment, which can each be aggregated to form a "point cloud" of measurements of the environment.

To scan a FOV, a multi-channel LiDAR device may be configured with one or more intrinsic and/or extrinsic parameters as described herein. Extrinsic parameters may be calibrated with respect to the LiDAR device's position relative to the surrounding environment. Channels of a LiDAR device may be calibrated based on a particular position and orientation (e.g., roll, pitch, and yaw) configuration that defines each channel's frame of reference with respect to the surrounding environment. In some instances, a multi-channel LiDAR device may be coupled to and/or otherwise integrated with a system (e.g., a vehicle), where extrinsic parameters may be calibrated to define the LiDAR device's position and orientation within the system and the surrounding environment. For example, extrinsic parameters indicative of a LiDAR device's orientation may be configured based on calibrated values for the LiDAR device's roll, pitch, and yaw, where the calibrated values may be used to process return signals from the surrounding environment. Extrinsic parameters associated with processing (e.g., translation) of return signal data to relevant range and position information may also be calibrated based on a LiDAR device's position in a system and the LiDAR device's roll, pitch, and yaw.

During operation of a LiDAR device in a system (e.g., a vehicle), the device's position and/or orientation may change due to external factors (e.g., bumps, shocks, vibrations, etc.). In some cases, a LiDAR device's position and/or orientation may change due to changes (e.g., deformations) in the shape of a system in which the LiDAR device is coupled and/or integrated. For example, the position of a LiDAR device coupled to a vehicle may change if the vehicle is involved in a collision. Examples of a change in position of a LiDAR device may be a 0.5-5 cm (or greater) translation of the LiDAR device from its original position. Examples of a change in orientation of a LiDAR device may include a 0.5-5° (or greater) shift in a device's configured roll, pitch, or yaw. Problematically, extrinsic parameters calibrated for the LiDAR device's original position or orientation may no longer be valid after a change in position and/or orientation, which may necessitate recalibration (or compensation) of the extrinsic parameters to maintain operating standards of the LiDAR device. To detect miscalibration of extrinsic parameters, an affected LiDAR device (and/or associated system) is often taken offline, such that the LiDAR device may not be used to detect surfaces and objects in a surrounding environment for a period of time. However, offline testing for miscalibration of extrinsic parameters can be a time-consuming and costly process, where the affected LiDAR device and/or system may be unavailable for use by an end-user.

Accordingly, it would be desirable to provide a LiDAR system that is structured and arranged to provide solutions to detect bias in the system's measurements resulting from changes in the position and orientation while the system remains in operation and, when such bias has been detected, to promptly initiate remediation of the bias (e.g., by dynamically recalibrating the system's extrinsic parameters during regular operation of the LiDAR device to compensate for the detected bias, or by notifying a user of the detected bias).
Some Examples of LiDAR Systems A light detection and ranging ("LiDAR") system may be used to measure the shape and contour of the environment surrounding the system. LiDAR systems may be applied to numerous applications including autonomous navigation and aerial mapping of surfaces. In general, a LiDAR system emits light that is subsequently reflected by objects within the environment in which the system operates. In some examples, the LiDAR system is configured to emit light pulses. The time each pulse travels from being emitted to being received (i.e., time-of-flight, "TOF" or "ToF") may be measured to determine the distance between the LiDAR system and the object that reflects the pulse. In other examples, the LiDAR system can be configured to emit continuous wave (CW) light. The wavelength (or frequency) of the received, reflected light may be measured to determine the distance between the LiDAR system and the object that reflects the light. In some examples, LiDAR systems can measure the speed (or velocity) of objects. The science of LiDAR systems is based on the physics of light and optics.

In a LiDAR system, light may be emitted from a rapidly firing laser. Laser light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1 depicts the operation of a LiDAR system 100, according to some embodiments. In the example of FIG. 1, the LiDAR system 100 includes a LiDAR device 102, which may include a transmitter 104 that generates and emits a light signal 110, a receiver 106 that detects a return light signal 114, and a control & data acquisition module 108. The transmitter 104 may include a light source (e.g., laser), electrical components operable to activate ("drive") and deactivate the light source in response to electrical control signals, and optical components adapted to shape and redirect the light emitted by the light source. The receiver 106 may include an optical detector (e.g., photodiode) and optical components adapted to shape return light signals 114 and direct those signals to the detector. In some implementations, one or more of optical components (e.g., lenses, mirrors, etc.) may be shared by the transmitter and the receiver. The LiDAR device 102 may be referred to as a LiDAR transceiver or "channel." In operation, the emitted (e.g., illumination) light signal 110 propagates through a medium and reflects off an object(s) 112, whereby a return light signal 114 propagates through the medium and is received by receiver 106.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 determines (e.g., measures) particular characteristics of the return light signal 114 detected by the receiver 106. For example, the control & data acquisition module 108 may measure the intensity of the return light signal 114 using any suitable technique.

A LiDAR transceiver 102 may include one or more optical lenses and/or mirrors (not shown) to redirect and shape the emitted light signal 110 and/or to redirect and shape the return light signal 114. The transmitter 104 may emit a laser beam (e.g., a beam having a plurality of pulses in a particular sequence). Design elements of the receiver 106 may include its horizontal field of view (hereinafter, "FOV") and its vertical FOV. One skilled in the art will recognize that the FOV parameters effectively define the visibility region relating to the specific LiDAR transceiver 102. More generally, the horizontal and vertical FOVs of a LiDAR system 100 may be defined by a single LiDAR device (e.g., sensor) or may relate to a plurality of configurable sensors (which may be exclusively LiDAR sensors or may have different types of sensors). The FOV may be considered a scanning area for a LiDAR system 100. A scanning mirror and/or rotating assembly may be utilized to obtain a scanned FOV.

In some implementations, the LiDAR system 100 may include or be electronically coupled to a data analysis & interpretation module 109, which may receive outputs (e.g., via connection 116) from the control & data acquisition module 108 and perform data analysis functions on those outputs. The connection 116 may be implemented using a wireless or non-contact communication technique.

Figure 2A:
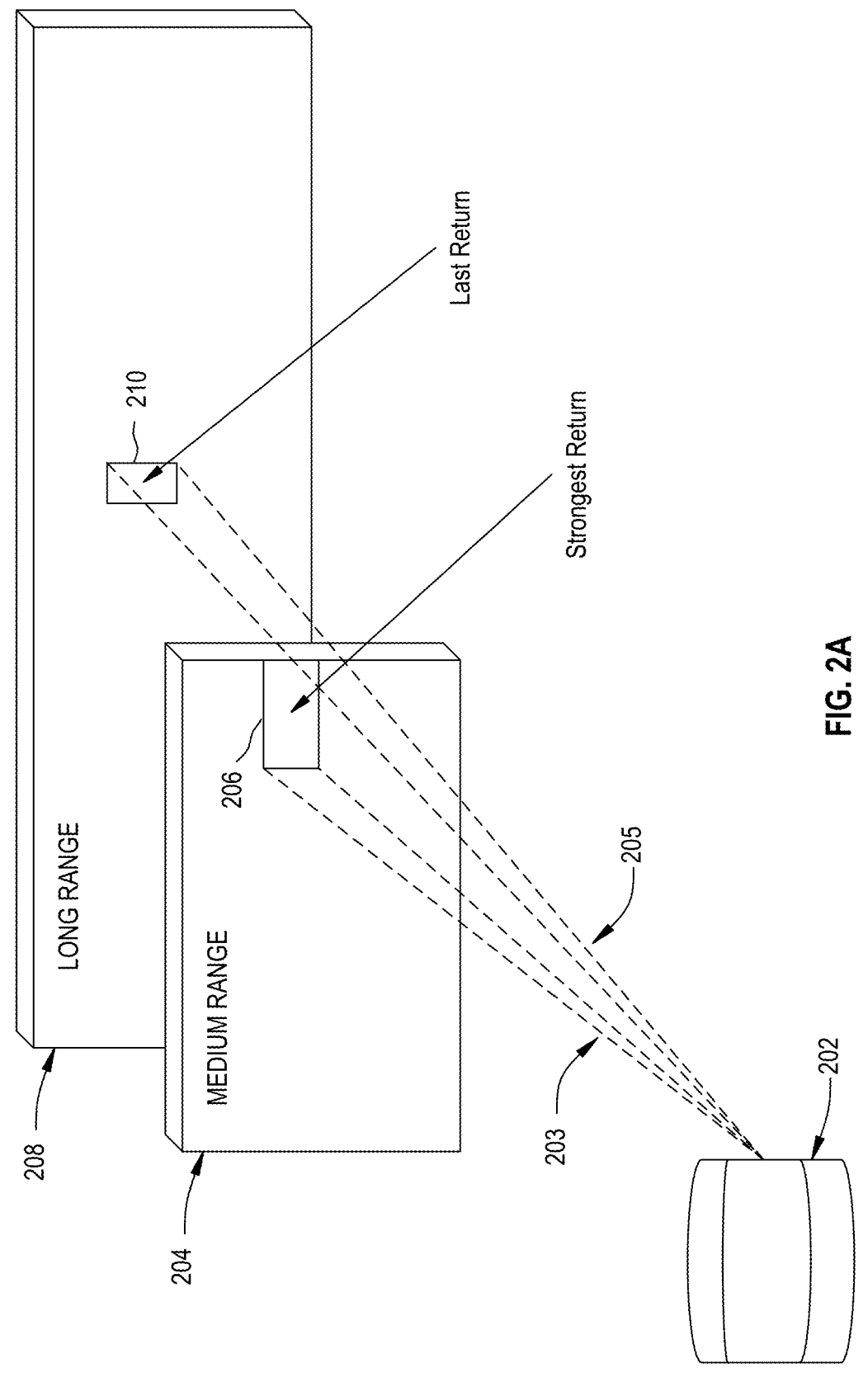
FIG. 2A shows an illustration of the operation of a LiDAR system, in accordance with some embodiments.

FIG. 2A illustrates the operation of a LiDAR system 202, in accordance with some embodiments. In the example of FIG. 2A, two return light signals 203 and 205 are shown. Laser beams generally tend to diverge as they travel through a medium. Due to the laser's beam divergence, a single laser emission may hit multiple objects at different ranges from the LiDAR system 202, producing multiple return signals 203, 205. The LiDAR system 202 may analyze multiple return signals 203, 205 and report one of the return signals (e.g., the strongest return signal, the last return signal, etc.) or more than one (e.g., all) of the return signals. In the example of FIG. 2A, LiDAR system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared with return signal 205. In both single- and multiple-return LiDAR systems, it is important that each return signal is accurately associated with the transmitted light signal so that one or more attributes of the object that reflect the light signal (e.g., range, velocity, reflectance, etc.) can be correctly calculated.

Some embodiments of a LiDAR system may capture distance data in a two-dimensional (2D) (e.g., single plane) point cloud manner. These LiDAR systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the LiDAR system to achieve 90-180-360 degrees of azimuth (horizontal) view while simplifying both the system design and manufacturability. Many applications require more data than just a 2D plane. The 2D point cloud may be expanded to form a three-dimensional ("3D") point cloud, in which multiple 2D point clouds are used, each pointing at a different elevation (e.g., vertical) angle. Design elements of the receiver of the LiDAR system 202 may include the horizontal FOV and the vertical FOV.

Figure 2B:
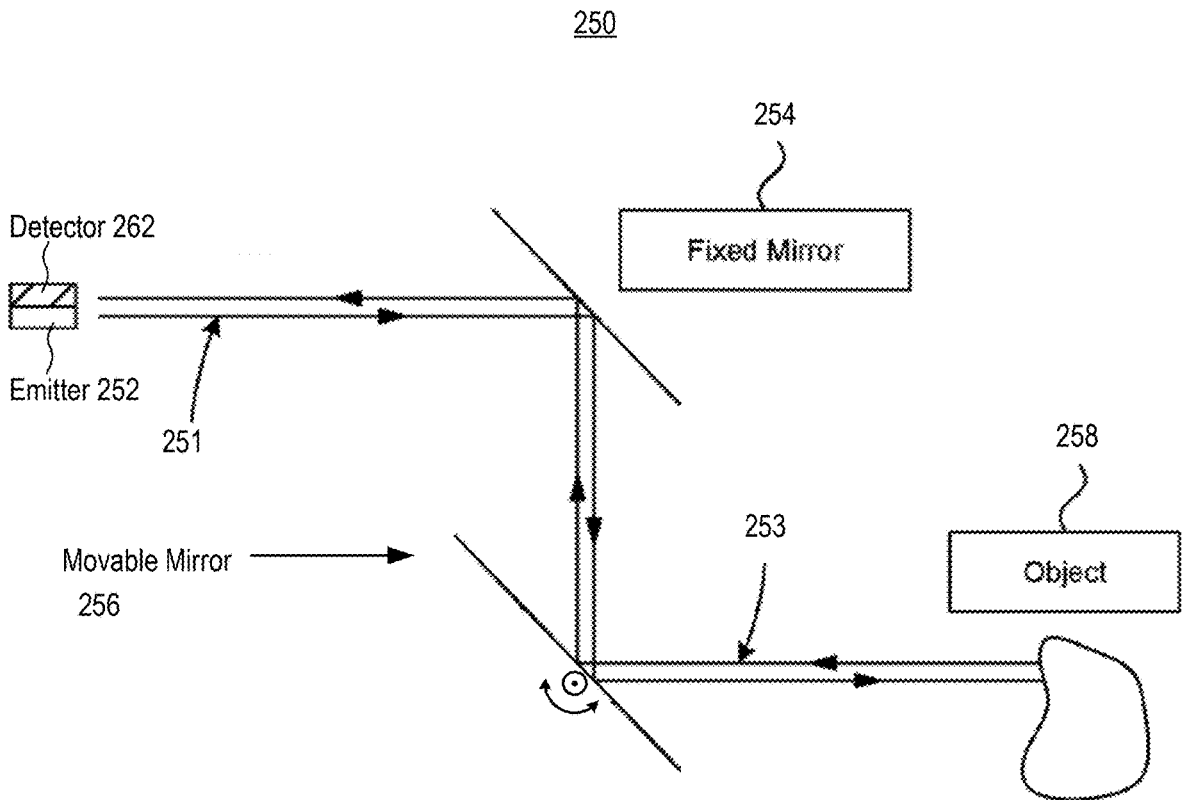
FIG. 2B shows an illustration of optical components of a channel of a LiDAR system with a movable mirror, in accordance with some embodiments.

FIG. 2B depicts a LiDAR system 250 with a movable (e.g., oscillating) mirror, according to some embodiments. In the example of FIG. 2B, the LiDAR system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. Design elements of the LiDAR system 250 include the horizontal FOV and the vertical FOV, which define a scanning area.

Figure 2C:
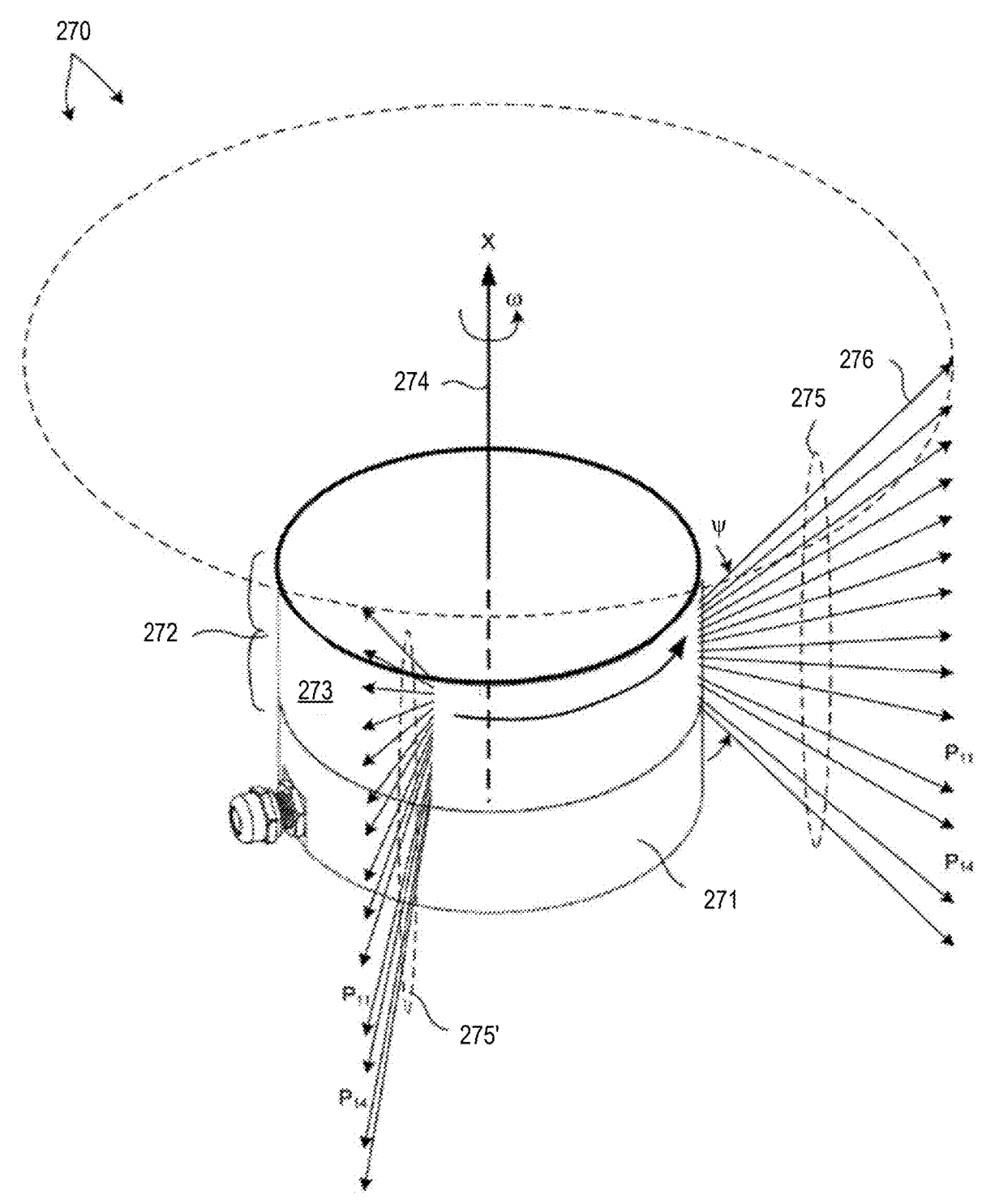
FIG. 2C is an illustration of an example of a three-dimensional ("3D") LiDAR system, in accordance with some embodiments.

FIG. 2C depicts a 3D LiDAR system 270, according to some embodiments. In the example of FIG. 2C, the 3D LiDAR system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D LiDAR system 270 includes a LiDAR transceiver 102 operable to emit laser beams 276 through the cylindrical shell element 273 of the upper housing 272. In the example of FIG. 2C, each individual arrow in the sets of arrows 275, 275' directed outward from the 3D LiDAR system 270 represents a laser beam 276 emitted by the 3D LiDAR system. Each beam of light emitted from the system 270 may diverge slightly, such that each beam of emitted light forms a cone of illumination light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D LiDAR system 270. The direction of each emitted beam may be determined by the angular orientation w of the transceiver's transmitter 104 with respect to the system's central axis 274 and by the angular orientation y of the transmitter's movable mirror 256 with respect to the mirror's axis of oscillation (or rotation). For example, the direction of an emitted beam in a horizontal dimension may be determined by the transmitter's angular orientation $\omega$, and the direction of the emitted beam in a vertical dimension may be determined by the angular orientation $\psi$ of the transmitter's movable mirror. Alternatively, the direction of an emitted beam in a vertical dimension may be determined the transmitter's angular orientation $\omega$, and the direction of the emitted beam in a horizontal dimension may be determined by the angular orientation $\psi$ of the transmitter's movable mirror. (For purposes of illustration, the beams of light 275 are illustrated in one angular orientation relative to a non-rotating coordinate frame of the 3D LiDAR system 270 and the beams of light 275' are illustrated in another angular orientation relative to the non-rotating coordinate frame.)

The 3D LiDAR system 270 may scan a particular point (e.g., pixel) in its field of view by adjusting the orientation $\omega$ of the transmitter and the orientation $\psi$ of the transmitter's movable mirror to the desired scan point ($\omega$, $\psi$) and emitting a laser beam from the transmitter 104. Likewise, the 3D LiDAR system 270 may systematically scan its field of view by adjusting the orientation $\omega$ of the transmitter and the orientation $\psi$ of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a LiDAR transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" of the scan point associated with the transmitted beam 110 and the return beam 114.

In many LiDAR systems, the optical component(s) of a LiDAR transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location L0 of the spot that would have been formed absent the intervening rotation of the optical component(s) during the ranging period is referred to herein as "walk-off." LiDAR-Based Object Detection In some embodiments, a LiDAR system 100 may aggregate environmental data (e.g., range and/or reflectance data) including point cloud measurements (e.g., described further with respect to FIGS. 4A-4F). Within such point cloud measurements, objects and/or surfaces may be represented by one or more point measurements, such that the objects and/or surfaces may be identified (e.g., visually identified) using LiDAR-based object detection techniques. To identify such objects and/or surfaces, point cloud measurements may be supplied to "object detection" and/or "environmental perception" systems, which may be configured to analyze the point cloud measurements to identify one or more specified objects and/or surfaces, including vehicles, pedestrians, cyclists, road signs, lane markings, etc. In some cases, the object detection and/or environmental perception systems may be configured to identify fiducial markers as described herein, which may be used as a part of a process for detecting mis-calibrated extrinsic LiDAR parameters. Non-limiting examples of fiducial markers identified using LiDAR-based object detection techniques may include lane markers and traffic signs. The LiDAR system 100 may provide aggregated return signal data to an object detection and/or environmental perception system (e.g., included with and/or external to the LiDAR system 100). The object detection and/or environmental perception system may analyze the aggregated return signal data and may provide object detection data and/or information (e.g., indications of detected object(s) in the point cloud measurements) to the LiDAR system 100, such that the LiDAR system 100 may identify fiducial markers within aggregated point cloud measurements. Some non-limiting examples of object detection and/or environmental perception systems that may be used as a part of a process for detection of miscalibrated extrinsic LiDAR parameters include those described by Rastiveis et al. in "Automated extraction of lane markings from mobile LiDAR point clouds based on fuzzy inference" (ISPRS Journal of Photogrammetry and Remote Sensing 160 (2020), pp. 149-166) and by H. Zhu et al. in "Overview of Environment Perception for Intelligent Vehicles" (IEEE Transactions on Intelligent Transportation Systems (2017), pp. 1-18.).

Positioning and Orientation of a LiDAR System

Some embodiments of a LiDAR system 100 may include one or more LiDAR devices/channels 102, where each LiDAR device 102 may be configured with one or more extrinsic parameters that define the device's position within the LiDAR system 100 and the device's orientation relative to the surrounding environment. In some cases, a particular LiDAR device 100 may be configured with extrinsic parameters that define the device's position within a LiDAR system 100. For example, a LiDAR device 102 integrated with a vehicle may be calibrated with extrinsic parameters defining a horizontal and vertical location of the LiDAR device 102 on the vehicle. In some cases, a particular LiDAR device 102 may be configured with extrinsic parameters that define the device's orientation relative to LiDAR system 100. Extrinsic parameters for orientation may include angular values of a device's roll, pitch, and yaw relative to the LiDAR system 102 and the surrounding environment. As an example a particular LiDAR system 100 that includes one or more LiDAR devices 102 may be configured to scan an area between 60-120° in the horizontal FOV and 20-120° in the vertical FOV relative to the ground. Based on scanning the horizontal FOV and vertical FOV, the LiDAR system 100 may generate a 3D point cloud of measurements that are representative of the surrounding environment within the angular ranges of the horizontal FOV and vertical FOV.

Figure 3A:
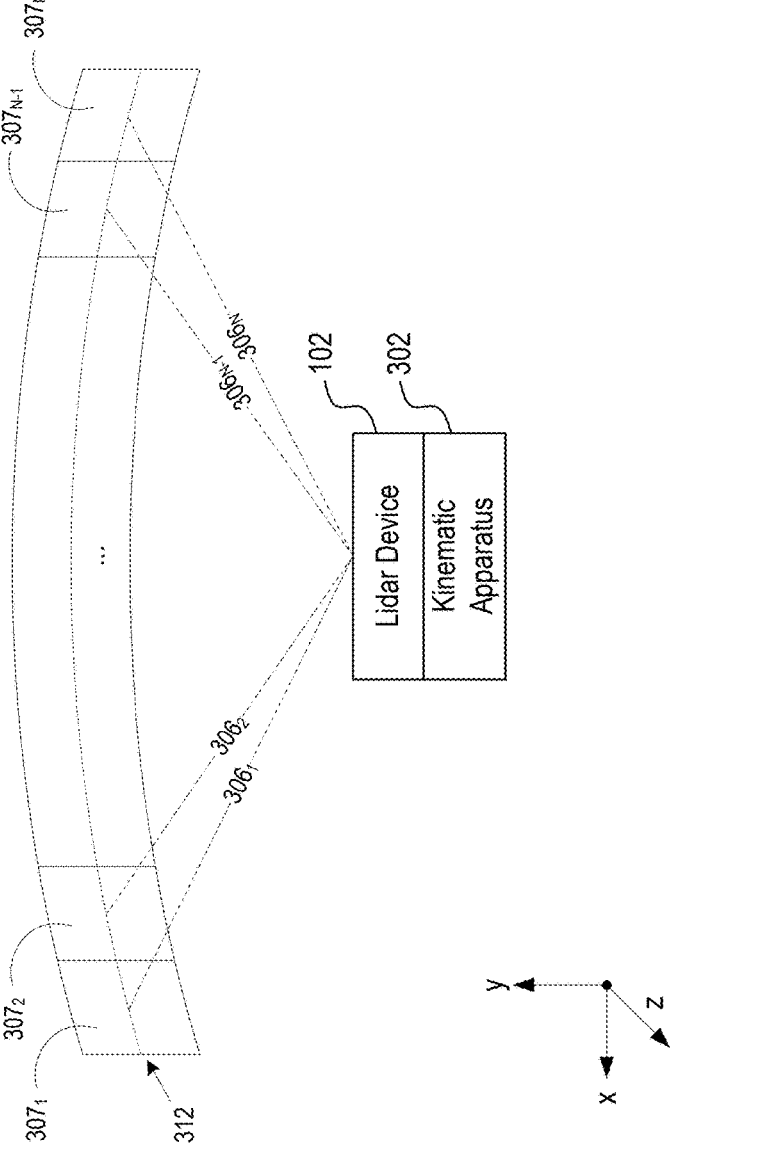
FIG. 3A shows an example of an orientation and a position of a LiDAR device relative to an operating environment, in accordance with some embodiments.

Referring to FIG. 3A, an example of a position and an orientation of a LiDAR device 102 relative to an operating environment 300 is shown. An operating environment 300 may include the LiDAR device 102. The LiDAR device 102 may be included in an apparatus 302 (e.g., a vehicle) that includes the LiDAR system 100, where the LiDAR system 100 may include one or more additional LiDAR devices 102. In some cases, the apparatus 302 may be kinematic, such that the apparatus 302 moves and/or travels within the operating environment 300. An example of an apparatus 302 may include a vehicle (e.g., 2-wheel vehicle, 4-wheel vehicle, greater than 4-wheel vehicle, etc.). In other cases, the apparatus 302 may be static, such that the apparatus 302 is stationary within the operating environment 300. In some cases, the LiDAR device 102 may be configured to scan a horizontal FOV and/or a vertical FOV as described herein. The LiDAR device 102 may scan the horizontal and/or the vertical FOV based on a configured position and orientation relative to the apparatus 302 and the operating environment 300. The position and orientation of the LiDAR device 102 may be defined relative to one or more frames of reference including, for example, an x-axis, y-axis, and z-axis as shown in FIG. 3A. Rotation about the x-axis may correspond to a configured pitch of the LiDAR device 102. Rotation about the y-axis may correspond to a configured yaw of the LiDAR device 102. Rotation about the z-axis may correspond to a configured roll of the LiDAR device 102. As described herein, a change in position of the LiDAR device 102 may correspond to a translation along any combination of the x-, y-, and z-axes and a change in orientation of the LiDAR device 102 may correspond to a rotation along any combination of the x-, y-, and z-axes. In some embodiments, the LiDAR device 102 may configured to rotate about one or more of the x-, y-, and z-axes. For example, as shown in FIG. 3A, the LiDAR device 102 may rotate about the y-axis to scan the horizontal FOV of the operating environment 300. One or more extrinsic parameters of the LiDAR device 102 may be configured based on the device's position and pitch, yaw, and roll relative to the x-, y-, and z-axes respectively.

In some embodiments, the LiDAR device 102 may scan one or more points 307 across a plane 312 (e.g., a horizontal plane) by emitting one or more optical signals 306 and detecting corresponding return signals. As shown in FIG. 3A, the LiDAR device 102 may emit N optical signals 306 to detect approximately N points 307 within the operating environment 300, where N may be any suitable number. Return signals corresponding to the emitted optical signals 306 may be used to generate a 2D point cloud of measurements. As an example, the LiDAR device 102 may emit over 100,000 optical signals 306 per second, such that approximately 100,000 points per second or more within the operating environment may be observed. In some embodiments, other measurements collected by the LiDAR device 102 (or one or more other LiDAR devices 102) may be aggregated (e.g., from any suitable number of positions in the vertical FOV) to form a 3D point cloud of measurements as described herein. Each point 307 may correspond to a surface and/or object in the operating environment 300 that is detected by the LiDAR device 102. While each point 307 in FIG. 3A is shown as positioned at a same distance from the LiDAR device 102, each point 307 may be positioned at any suitable distance from the LiDAR device 102 based on the objects/surfaces in the operating environment 300.

In some embodiments, to scan one or more points 307 in the operating environment 300, the LiDAR device may scan across a scanning plane 312. In some cases. As shown in FIG. 3A, the plane 312 may be horizontal relative to the operating environment 300. In other cases, the plane 312 may be vertical or a combination of horizontal and vertical. To scan the one or more points 307 across the plane 312, the LiDAR device 102 may be oriented with a configured roll, pitch, and yaw. In some cases, the LiDAR system 100 (or apparatus 302) may change the roll, pitch, or yaw of the LiDAR device 102 to scan the one or more points 307. The LiDAR device 102 may emit optical signals 306 to scan the points 307 uniformly (e.g., at regular intervals), non-uniformly (e.g., at irregular intervals), or in any other suitable way.

Figure 3B:
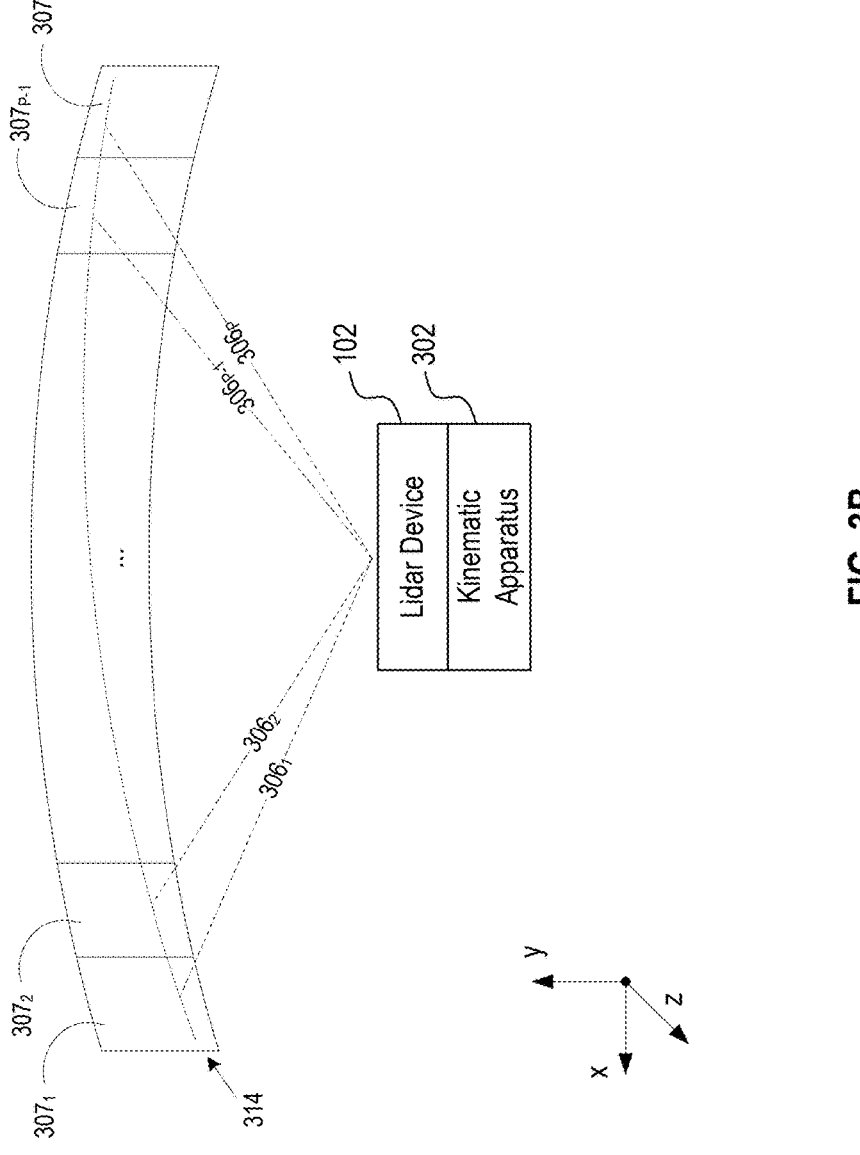
FIG. 3B shows an example of a changed orientation of a LiDAR device relative to an operating environment, in accordance with some embodiments.
Figure 3C:
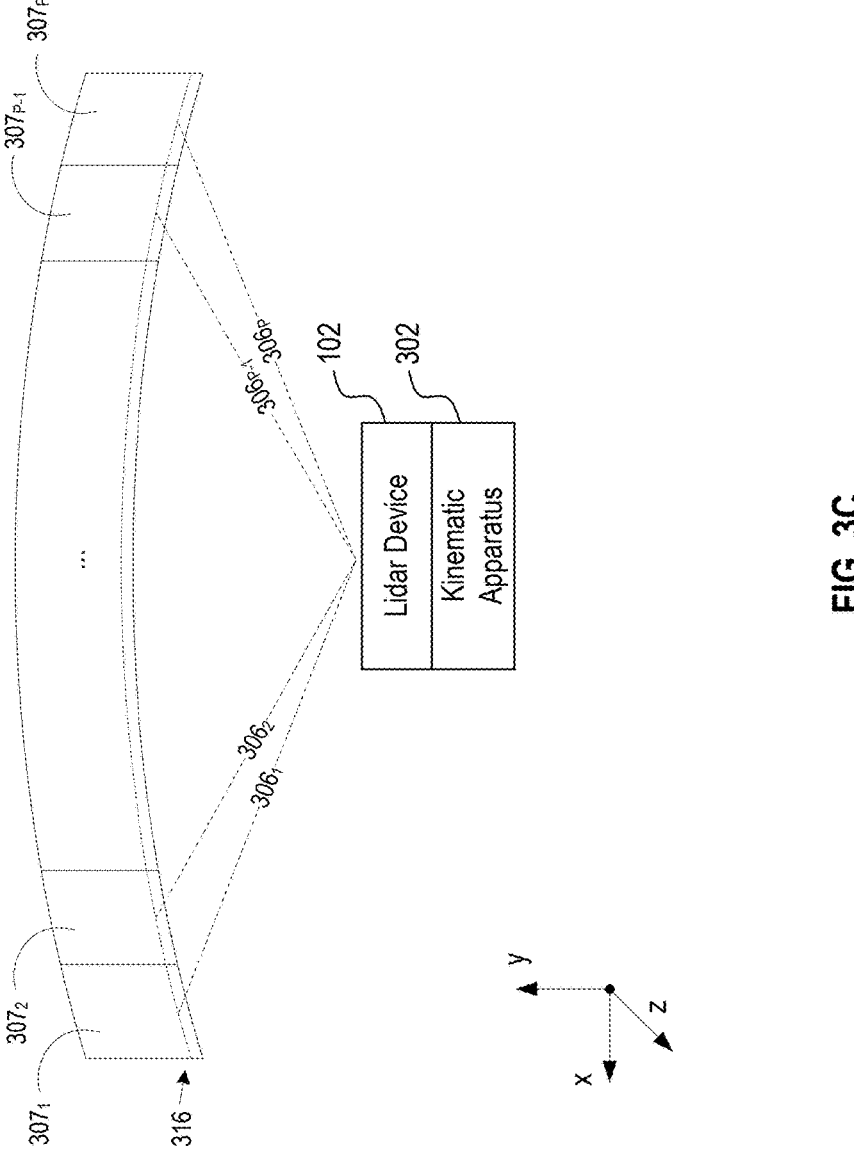
FIG. 3C shows an example of a changed orientation of a LiDAR device relative to an operating environment, in accordance with some embodiments.
Figure 3D:
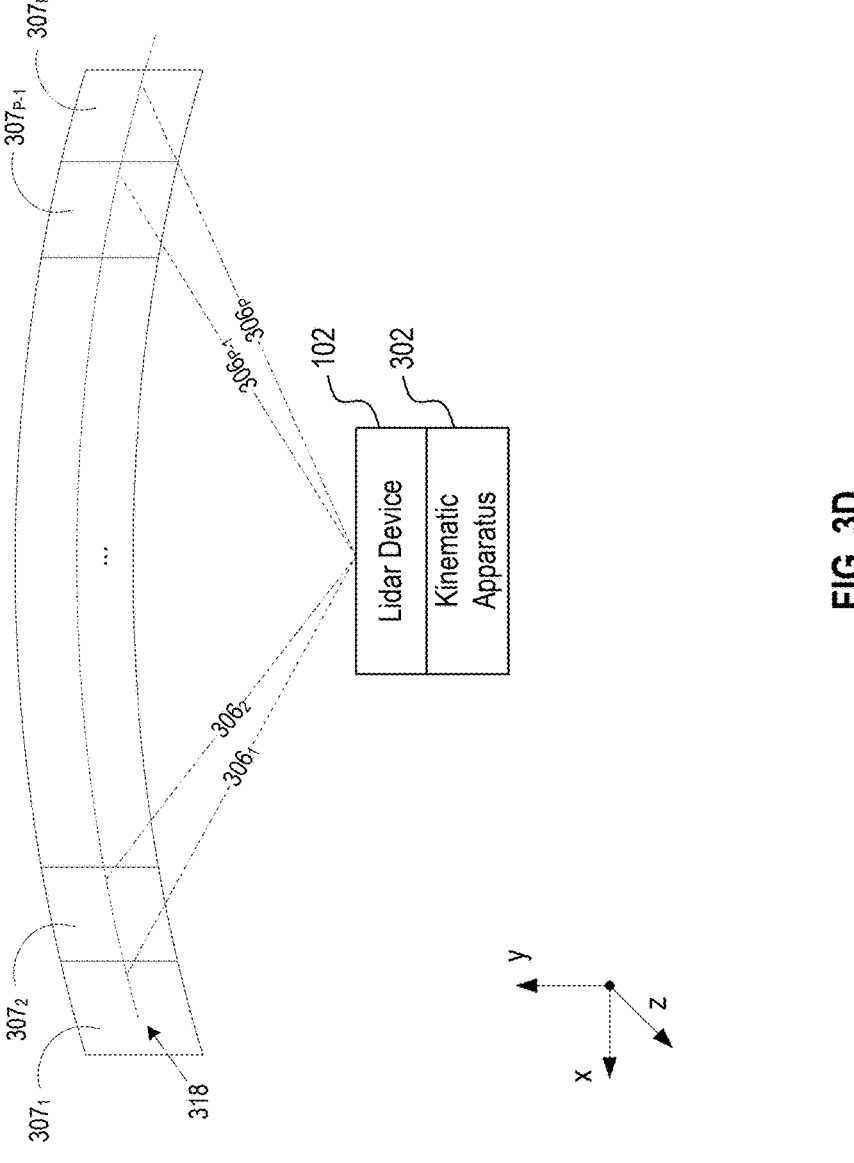
FIG. 3D shows an example of a changed orientation of a LiDAR device relative to an operating environment, in accordance with some embodiments.

In some embodiments, as described herein, the position and/or the orientation (e.g., roll, pitch, and/or yaw) of a LiDAR device 102 may inadvertently change during operation. External factors (e.g., bumps, shocks, vibrations, etc.) may cause the position of the LiDAR device 102 to shift from the position(s) and/or orientation(s) for which extrinsic parameters were calibrated. Accordingly, the shift in position or orientation may introduce bias to the LiDAR device's measurements at the one or more points 307. Biased measurements at the one or more points 307 may result in distorted and/or otherwise inaccurate point cloud measurements that are not representative of the objects and surfaces in the operating environment 300. Referring to FIGS. 3B, 3C, and 3D, examples of changed orientations of a LiDAR device 102 relative to an operating environment 300 are shown. The changed orientations (e.g., represented by scanning planes 314, 316, and 318) of the LiDAR device 102 in FIGS. 3B, 3C, and 3D, may be changed relative to the orientation (e.g., represented by the scanning plane 312) of LiDAR device 102 in FIG. 3A.

FIG. 3B shows a change in a configured roll of the LiDAR device 102 relative to the operating environment 300. The orientation of the LiDAR device 102 may change such that the LiDAR device 102 and the corresponding scanning plane 314 rotate relative to the FOV of the operating environment 300. In some cases, the LiDAR device 102 and the scanning plane 314 may rotate along the z-axis relative to the scanning plane 312 as shown in FIG. 3A. Accordingly, the LiDAR device 102 may scan one or more points 307 along the scanning plane 314. Due to the change in the roll of the LiDAR device 102 (e.g., rotation of the LiDAR device about the z-axis), the LiDAR device 102 may inadvertently scan the one or more points 307 at a plurality of different vertical locations in the operating environment 300 relative to the scanning plane 312. For example, as shown in FIG. 3B, the LiDAR device 102 may emit optical signals $306_1$ and $306_2$ at points $307_1$ and $307_2$, which may be located at a lower vertical location (e.g., on the y-axis) than the optical signals $306_{P-1}$ and $306_P$ emitted at points $307_{P-1}$ and $307_P$. Because of the change to the emitted optical signals 307 relative to the operating environment 300, the LiDAR system 100 (and/or apparatus 302) may process biased return signal data corresponding to return signal(s) reflecting from the one or more points 307. Biased return signal data may include distortions for one or more of an intensity of a return signal, a temporal location (e.g., TOF) of a return signal, and a location of an object and/or surface corresponding to a return signal in relation to the LiDAR device 102. Such biased return signal may cause systems (e.g., LiDAR system 100 and/or apparatus 302) that rely on the LiDAR device 102 for accurate environmental data to fail. For example, in the context of autonomous navigation, sampling biased return signal data can lead to the use of low-resolution and/or inaccurate measurements of position(s) of object(s) in the operating environment 300, which can further cause an autonomous vehicle to navigate inefficiently or even collide with other objects in the environment based on the lack of accurate environmental data.

FIG. 3C shows a change in a configured pitch of the LiDAR device 102 relative to the operating environment 300. The orientation of the LiDAR device 102 may change such that the LiDAR device 102 and scanning plane 316 point at a different elevation (e.g., vertical) angle relative to the FOV of the operating environment. In some cases, the LiDAR device 102 and the scanning plane 316 may rotate along the x-axis relative to the scanning plane 312 as shown in FIG. 3A. Accordingly, the LiDAR device 102 may scan one or more points 307 along the scanning plane 316. Due to the change in the pitch of the LiDAR device 102 (e.g., rotation about the x-axis), the LiDAR device 102 may inadvertently scan the one or more points 307 at a different vertical location in the operating environment 300 relative to the scanning plane 312. For example, as shown in FIG. 3C, the LiDAR device 102 may emit optical signals $306_1$, $306_2$, $306_{P-1}$, and $306_P$ at points $307_1$, $307_2$, $307_{P-1}$, and $307_P$ respectively, which may each be located at a lower vertical location (e.g., on the y-axis) than the optical signals 306 emitted along the scanning line 312 as described with respect to FIG. 3A. Because of the change to the emitted optical signals 306 relative to the operating environment 300, the LiDAR system 100 (and/or apparatus 302) may process biased return signal data corresponding to return signal(s) reflecting from the one or more points 307 as described herein.

FIG. 3D shows a change in a configured yaw of the LiDAR device 102 relative to the operating environment 300. The orientation of the LiDAR device 102 may change such that the LiDAR device 102 and scanning plane 318 point at a different range of horizontal angles relative to the FOV of the operating environment. In some cases, the LiDAR device 102 and the scanning plane 318 may rotate along the y-axis relative to the scanning plane 312 as shown in FIG. 3A. Accordingly, the LiDAR device 102 may scan one or more points 307 along the scanning plane 318. Due to the change in the yaw of the LiDAR device 102 (e.g., rotation about the y-axis), the LiDAR device 102 may inadvertently scan the one or more points 307 at a different horizontal location in the operating environment 300 relative to the scanning plane 312. For example, as shown in FIG. 3D, the LiDAR device 102 may emit optical signals $306_1$, $306_2$, $306_{P-1}$, and $306_P$ at points $307_1$, $307_2$, $307_{P-1}$, and $307_P$ respectively, which may each be located at a different horizontal location (e.g., on the x-axis) than the optical signals 306 emitted along the scanning line 312 as described with respect to FIG. 3A. Because of the change to the emitted optical signals 306 relative to the operating environment 300, the LiDAR system 100 (and/or apparatus 302) may process biased return signal data corresponding to return signal(s) reflecting from the one or more points 307 as described herein. External factors may cause a change in any combination of the roll, pitch, and/or yaw of a LiDAR device 102 as described herein with respect to FIGS. 3B, 3C, and 3D.

Figure 4A:
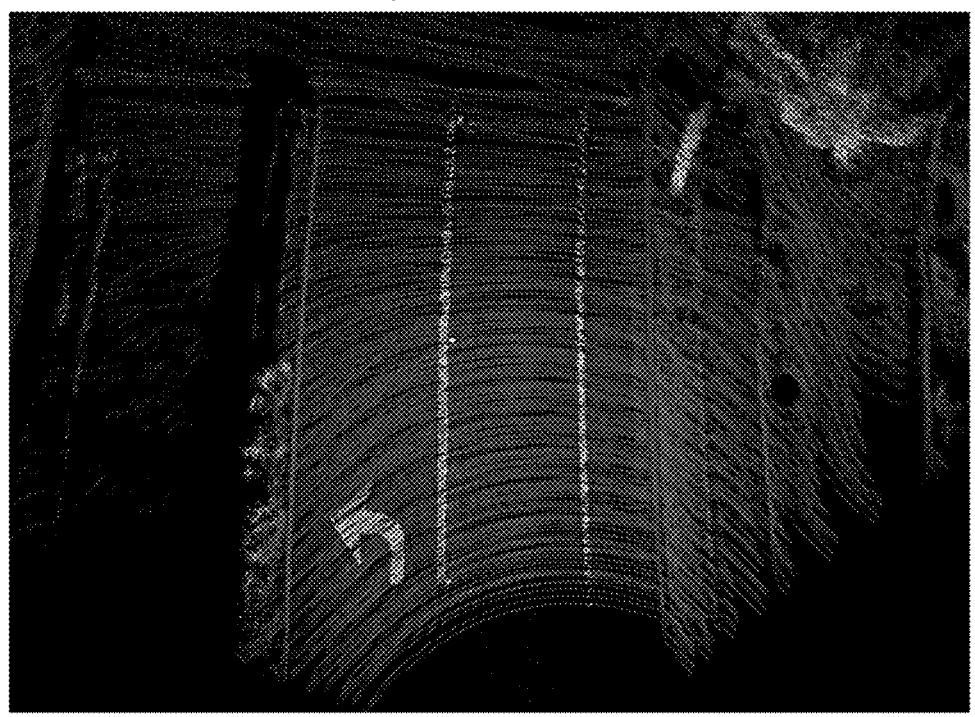
FIG. 4A shows an example of point measurements from a LiDAR device, in accordance with some embodiments.
Figure 4B:
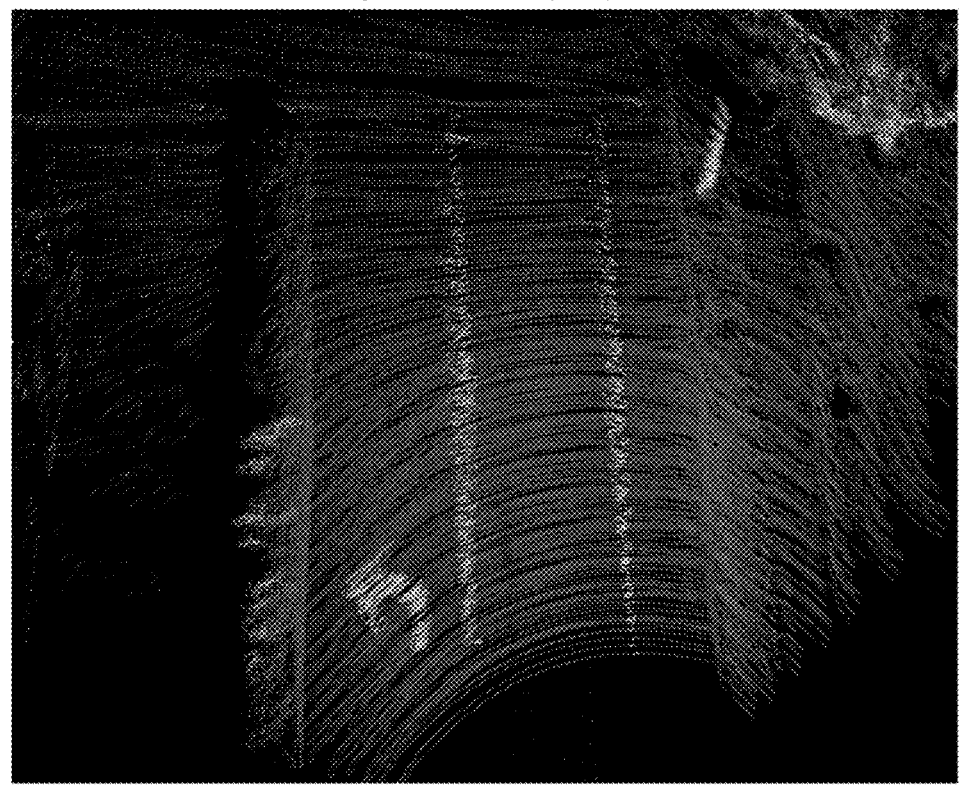
FIG. 4B shows an example of point measurements from a LiDAR device with a changed orientation, in accordance with some embodiments.

FIGS. 4A and 4B show an example of point measurements from a LiDAR device, in accordance with some embodiments. Regarding FIG. 4A, point measurements 402 that are representative of a roadway and surrounding environment are shown, where the point measurements 402 are obtained via one or more LiDAR devices 102 of a LiDAR system 100 having a configured position and orientation. The point measurements 402 include representations of fiducial markers including lane markers and road markers. Referring to FIG. 4B, distorted point measurements 404 that are representative of the roadway and surrounding environment from FIG. 4A are shown, where the point measurements 404 are obtained via one or more LiDAR devices 102 of a LiDAR system 100 having a changed orientation. The point measurements 404 are distorted compared to the point measurements 402 due to an approximately 4 degree shift in the yaw (e.g., rotation about the y-axis with respect to FIGS. 3A-3D) of the LiDAR system 100. As shown in FIG. 4B, visual distortions (e.g., blurring) are present in the image of the lane markers and roadway marking. The shift in yaw as represented by the point cloud measurements 408 may occur during operation of the LiDAR system 100.

Figure 4C:
FIG. 4C shows an example of point measurements from a LiDAR device, in accordance with some embodiments.
Figure 4D:
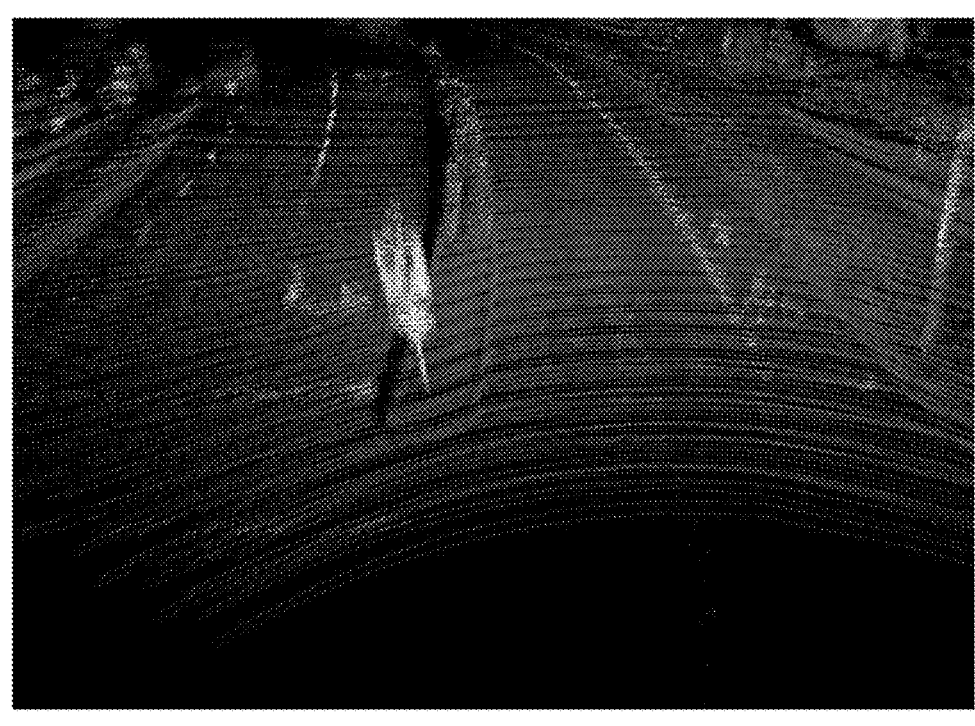
FIG. 4D shows an example of point measurements from a LiDAR device with a changed orientation, in accordance with some embodiments.

FIGS. 4C and 4D show an example of point measurements from a LiDAR device, in accordance with some embodiments. Regarding FIG. 4C, point measurements 406 that are representative of a roadway are shown, where the point measurements 406 are obtained via one or more LiDAR devices 102 of a LiDAR system 100 having a configured position and orientation. The point measurements 406 include representations of fiducial markers including lane markers, road markers, and street signs. Referring to FIG. 4D, distorted point measurements 408 that are representative of the roadway from FIG. 4C are shown, where the point measurements 408 are obtained via one or more LiDAR devices 102 of a LiDAR system 100 having a changed orientation. The point measurements 408 are distorted compared to the point measurements 406 due to an approximately 2 degree shift in the pitch (e.g., rotation about the x-axis with respect to FIGS. 3A-3D) of the LiDAR system 100. As shown in FIG. 4D, visual distortions (e.g., blurring) are present in the image of the lane markers, roadway markings, and street signs. The shift in pitch as represented by the point cloud measurements 408 may occur during operation of the LiDAR system 100.

Figure 4E:
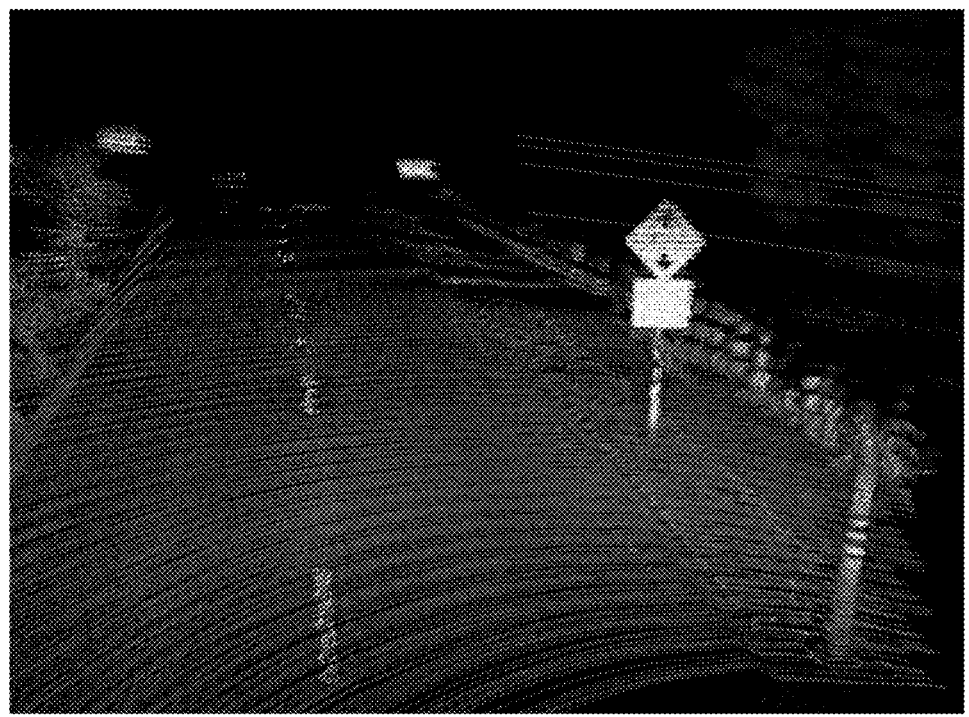
FIG. 4E shows an example of point measurements from a LiDAR device, in accordance with some embodiments.
Figure 4F:
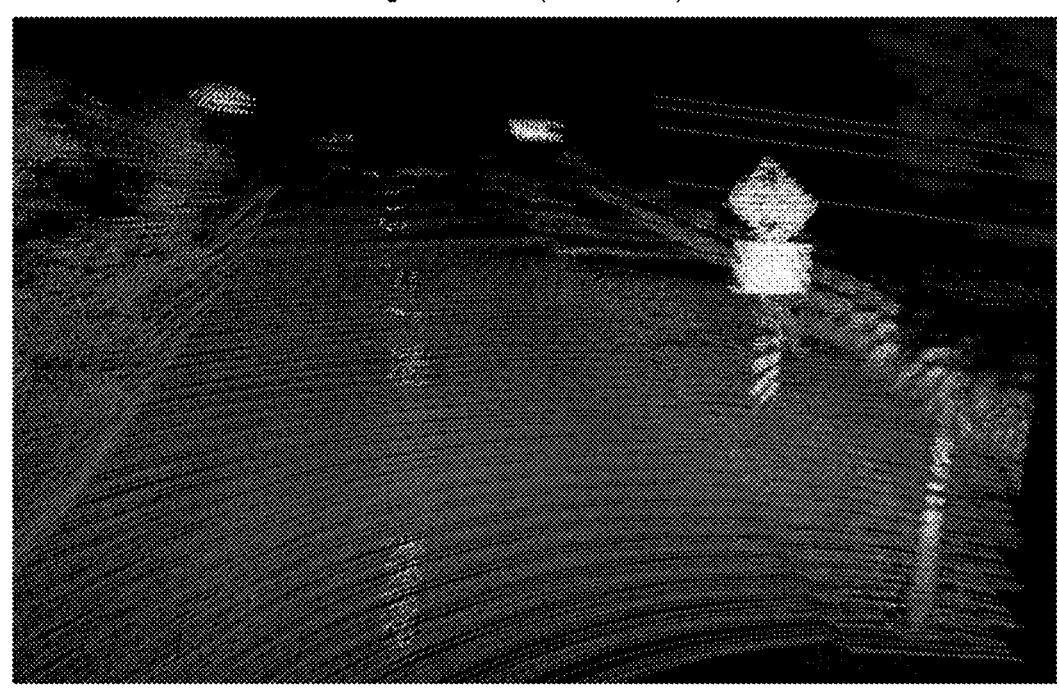
FIG. 4F shows an example of point measurements from a LiDAR device with a changed position, in accordance with some embodiments.

FIGS. 4E and 4F show an example of point measurements from a LiDAR device, in accordance with some embodiments. Regarding FIG. 4E, point measurements 406 that are representative of a roadway and surrounding environment are shown, where the point measurements 4010 are obtained via one or more LiDAR devices 102 of a LiDAR system 100 having a configured position and orientation. The point measurements 410 include representations of fiducial markers including lane markers and street signs. Referring to FIG. 4F, distorted point measurements 412 that are representative of the roadway from FIG. 4E are shown, where the point measurements 412 are obtained via one or more LiDAR devices 102 of a LiDAR system 100 having a changed point. In the example of FIGS. 4E and 4F, the point measurements 408 are distorted compared to the point measurements 406 due to an approximately 1 meter translation of the LiDAR system 100. As shown in FIG. 4F, visual distortions (e.g., blurring) are present in the image of the lane markers and street signs. The shift in position of the LiDAR system 100 as represented by the point cloud measurements 408 may occur during operation of the LiDAR system 100.

Methods for Detecting Miscalibration of Extrinsic LiDAR Parameters

In some embodiments, to detect miscalibration of extrinsic LiDAR parameters (e.g., due to changes in the position or orientation of a LiDAR device 102 relative to the surrounding environment and/or relative to an apparatus 302), the LiDAR system 100 may perform a method for detecting miscalibration of extrinsic parameters. In some embodiments, the detection method may be performed (and miscalibration of a LiDAR device 102 may be detected) during normal operation of the LiDAR system 100, without taking the LiDAR device 102 (and/or the LiDAR system 100) offline.

In some embodiments, to compensate for changes to a position or an orientation of a LiDAR device 102 relative to the surrounding environment and/or relative to an apparatus 302, a LiDAR system 100 may detect and/or remediate miscalibrated extrinsic parameters using dynamic extrinsic parameter detection techniques. A LiDAR system 100 may perform dynamic extrinsic parameter detection during normal operation of LiDAR device(s) 102, such that miscalibrated extrinsic parameters may be identified and/or remediated without taking an affected LiDAR device 102 (and associated system) offline. During detection of extrinsic parameter miscalibration, the LiDAR system 100 may detect changes in a position (e.g., by a translation) and/or an orientation (e.g., roll, pitch, and/or yaw) in any particular LiDAR device 102 and may detect and/or remediate bias (e.g., position or orientation distortion) included in sampled return signal data.

In some embodiments, to detect changes in a position and/or orientation of a LiDAR device 102, a LiDAR system 100 may be configured to identify one or more fiducial markers (e.g., objects or surfaces having pre-determined shapes, sizes, or patterns) in an operating environment 300. A fiducial marker may be an object or a surface in the operating environment 300 that may be used as a point or area of reference for detecting changes in a position and/or orientation of a LiDAR device 102. A fiducial marker may have a distinctive visual representation (i.e., "signature") that may be identified by the LiDAR system 100. The visual representation of the fiducial marker may identify (e.g., uniquely identify) the fiducial marker based on its dimensions, reflectivity, and/or other attributes. In some cases, a fiducial marker may have a standardized shape, including, for example, the standardized shapes of road markings and signs. A LiDAR system 100 may identify a particular fiducial marker in the operating environment 300 by analyzing distance and intensity data corresponding to a 3D point cloud of measurements. Point cloud measurements that show objects having similar dimensional, reflectance, and position data may be identified as corresponding to a particular fiducial marker. As an example, for a lane marking on a roadway, point cloud measurements corresponding to the roadway may show higher return signal intensities at the locations and dimensions of the lane markings (compared to the surrounding roadway), where the point could measurements corresponding to the higher return signal intensities may be clustered in the shape of the lane markings. As another example, for a STOP sign on a roadway, point cloud measurements corresponding to the STOP sign may show higher return signal intensities clustered in an octagonal shape of the STOP sign. The LiDAR system 100 may identify any suitable fiducial marker based on a combination of the dimensions, location, return signal intensity, and distance corresponding to objects/surfaces indicated by return signal data.

In some embodiments, the LiDAR system 100 may use detected changes (e.g., distortions) in the shape and/or size of an image (e.g., an image generated from point cloud measurements) of one or more fiducial markers (relative to a reference image or other representation of the fiducial marker(s)) to detect changes in the position and/or orientation of a LiDAR device 102. In some cases, the LiDAR system 100 may use fiducial markers (e.g., standardized fiducial markers) that have a standardized shape and/or size. Some non-limiting examples of standardized fiducial markers may include roadway lane markers, street signs, and traffic lights. Any other suitable fiducial marker having a standardized shape and/or size may be used. The LiDAR system 100 may store a representation (e.g., visual representation) of a size and/or shape of a standardized fiducial marker, such that the standardized fiducial marker is one of a plurality of reference fiducial markers stored by the LiDAR system 100. Detected changes in in the shape and/or size of an image of one or more fiducial markers may be aggregated when the LiDAR system 100 and/or the one or more fiducial markers are in motion (e.g., based on linear and/or non-linear changes in their respective motion).

In some cases, the LiDAR system 100 may compare a shape/size of an image of an identified fiducial marker to a corresponding shape/size of a reference fiducial marker. The LiDAR system 100 may include and/or otherwise access one or more stored representations (e.g., images, dimensions, and/or reflectance values) of reference fiducial markers. Based on the comparison, the LiDAR system 100 may identify a difference (e.g., distortion) between attributes (e.g., dimensions) of the reference fiducial marker and attributes of the detected fiducial marker. For example, the LiDAR system 100 may identify a difference between the size/shape of the reference fiducial marker and the detected shape/size of the standardized fiducial marker. As an example, the LiDAR system 100 may store reference data indicating a width of 2.5 inches for a standard lane marker on a roadway. During operation of the LiDAR system 100, a particular LiDAR device 102 may identify a point cloud representation of a standard lane marker as having a width of 3 inches, which may be compared to the stored reference width of 2.5 inches. The LiDAR system 100 may identify the difference in width of the stored reference lane marker and the detected lane marker, causing the LiDAR system 100 to identify a change in the position of the particular LiDAR device 102 (and an invalidity or miscalibration of the calibrated extrinsic parameters). Based on the change in position of the particular LiDAR device 102, the LiDAR system may compensate for bias included in return signal data as described below. As described below, the LiDAR system 100 may compare a shape/size of an image of an identified fiducial marker to a corresponding shape/size of a reference fiducial marker when at least one of the LiDAR system 100 and the identified fiducial marker are in motion.

In some cases, the LiDAR system 100 may identify and/or otherwise determine a representation of a reference fiducial marker when both the LiDAR system 100 and the reference fiducial marker are stationary. As an example, for a STOP sign, the LiDAR system 100 may emit one or more optical signals 306 and may determine a reference size and shape of the STOP sign based on the corresponding return signal data, which may then be stored as a representation of the STOP sign for future reference. The system's ability to generate new reference representations of fiducial markers may be used when the system moves between regions (e.g., countries) in which the attributes of fiducial markers (e.g., lane markings, road signs, etc.) differ.

In some embodiments, the LiDAR system 100 may use fiducial markers (e.g., known fiducial markers) that are known to and/or frequently detected by the LiDAR system 100. As an example, for a vehicle that includes the LiDAR system 100, the LiDAR system 100 may identify fiducial markers that are frequently detected in the system's FOV. The LiDAR system 100 may store a representation of a size and/or shape of a known fiducial marker, such that the known fiducial marker is one of a plurality of reference fiducial markers stored by the LiDAR system 100. In some cases, the LiDAR system 100 may receive and/or otherwise obtain spatial data (e.g., location data) indicating a location of the LiDAR system 100 (and associated apparatus 302). Based on detecting one or more fiducial markers in the operating environment 300, the LiDAR system 100 may associate each detected fiducial marker with spatial data. In an example, spatial data may include an indicator (e.g., coordinates, geofence, etc.) of a geographic location or area corresponding to the detected fiducial marker. By associating a particular fiducial marker with spatial data, the LiDAR system 100 may detect the fiducial marker when the LiDAR system 100 is within a proximity (e.g., a visual proximity within the range of the LiDAR channel(s) 102) of the location of the fiducial marker. As an example, for a LiDAR system 100 integrated with a vehicle, the LiDAR system 100 may identify a mailbox located proximal to an end-user's home as a frequently detected fiducial marker, such that the LiDAR system 100 may use the mailbox as a fiducial marker for detection of extrinsic parameter miscalibration or for dynamic extrinsic parameter calibration. Any other suitable fiducial marker that is known to the LiDAR system 100 may be used.

In some embodiments, a LiDAR system 100 may detect dynamic extrinsic parameter miscalibration for LiDAR devices 102 included in a kinematic (e.g., moving) apparatus 302 and/or for LiDAR devices 102 included in a stationary apparatus 302 where identified fiducial markers are in motion relative to the stationary apparatus 302. As an apparatus 302 (that includes a LiDAR system 100) is in motion, the LiDAR system 100 may scan the FOV to detect objects and surfaces in the operating environment 300. As the apparatus's 302 (and LiDAR system's 100) motion changes (e.g., via acceleration, deceleration, turning, etc.) in linear and/or non-linear path, bias may be introduced to return signal data detected by a receiver 106, causing distortion of identified attributes (e.g., positions, dimensions, reflectance values, etc.) of objects/surfaces in the operating environment 300. Such bias may be approximately negligible when extrinsic parameters for a LiDAR device 102 are calibrated for the device's position and orientation (e.g., roll, pitch, and yaw), but if a LiDAR device's position or orientation changes from a calibrated position, such bias may result in distorted return signal data that misrepresents the position of objects/surfaces in the operating environment 300. Accordingly, the LiDAR system 100 may detect changes in a position and orientation of a particular LiDAR device 102 during one or more time periods where an apparatus's 302 motion changes. As an example, where an apparatus 302 is a vehicle, the one or more time periods corresponding to changes in the vehicle's motion may be time periods of acceleration, deceleration, and/or turning (e.g., change in direction of the vehicle's motion). In some cases, distortions in return signal data may be especially pronounced during time periods where an apparatus 302 is turning (e.g., traveling along an arc). For example, a point cloud of measurements detected by a vehicle-mounted LiDAR system 100 as the vehicle turns may show detected objects and surfaces as more distorted compared to a point cloud of measurements detected as the vehicle travels in a straight path at a constant speed.

In some embodiments, as an apparatus 302 (that includes a LiDAR system 100) is stationary, the LiDAR system 100 may scan the FOV to detect moving objects and surfaces (e.g., potential fiducial markers) in the operating environment 300. Any suitable motion detection techniques may be used to detect and identify moving objects. As a particular fiducial marker changes position (e.g., in a linear and/or non-linear path) relative to a stationary apparatus 302 (and included LiDAR system 100), bias may be introduced to return signal data detected by a receiver 106, causing distortion of an identified representation of the particular fiducial marker in motion. Such bias may be approximately negligible when extrinsic parameters for a LiDAR device 102 are calibrated for the device's position and orientation (e.g., roll, pitch, and yaw), but if a device's position or orientation changes from a calibrated position, such bias may result in distorted return signal data that misrepresents the position of objects/surfaces in the operating environment 300. Accordingly, the LiDAR system 100 may detect changes in a position and orientation of a particular LiDAR device 102 during one or more time periods where a fiducial marker's position changes and where the LiDAR system 100 is stationary. As an example, where an apparatus 302 is a vehicle, the one or more time periods corresponding to changes in a fiducial marker's motion changes may be time periods where the fiducial marker accelerates, decelerates, and/or changes direction relative to the LiDAR system 100.

In some embodiments, the LiDAR system 100 may receive and/or otherwise obtain speed data and turning (e.g., directional) data for the apparatus 302. Examples of speed data may include a speed of the apparatus 302 sampled at one or more time instants and an average speed of the apparatus 302. The one or more time instants may include a present time instant and/or one or more previous time instants. Examples of turning data may include a direction of the apparatus 302 sampled at one or more time instants and a direction of a directional control (e.g., steering) mechanism of an apparatus 302 sampled at one or more time instants. In some cases, the LiDAR system 100 may process turning data to identify a turning radius of the apparatus 302. For example, based on receiving turning data that indicates a direction of a steering mechanism of the apparatus 302 for a period of time, the LiDAR system 100 may determine the apparatus's average turn radius for the period of time. The LiDAR system 100 may be configured with one or more parameters associated with the composition and/or size of the apparatus 302, such that the LiDAR system 100 may determine the object's turn radius for a period of time as described herein. Examples of parameters used to determine a turning radius may include dimensions of a wheel-base, wheel size, a length of the apparatus 302, a width of the apparatus 302, a differential wheel speed of turning wheels on the apparatus 302, etc.

In some embodiments, during operation of a particular LiDAR device 102 in a kinematic apparatus 302, the kinematic apparatus 302 may change direction during one or more time periods. The kinematic apparatus 302 may change direction (e.g., turn left or right) along one or more turning radiuses for one or more periods of time while the apparatus 302 is in motion. For example, a vehicle than includes the LiDAR system 100 may turn as a drive operates the vehicle the travel to a destination, where the LiDAR system 100 may scan the FOV as the vehicle operates. To detect changes in a position or orientation of a particular LiDAR device 102, the LiDAR system 100 may aggregate return signal data obtained during one or more time periods. The one or more time periods may correspond to time periods where the LiDAR system 100 and/or the corresponding apparatus 302 is turning and/or changing direction in a particular direction (e.g., left or right) within a particular range of turning radiuses or less than a threshold turning radius. As an example, a turning radius of between 1 meter and 50 meters (or any other suitable turning radius) while traveling along an arc that is at least approximately 5 degrees of a circle may be preferred to determine return signal data that may be used to identify changes in a position (e.g., translation of the LiDAR device 102) or orientation (e.g., roll) of a particular LiDAR device 102. The LiDAR system 100 may determine a turning radius (e.g., an average turning radius) and a distance corresponding to the apparatus 302 traveling along a non-linear path (e.g., arc) based on speed and turning data corresponding to the apparatus 302 as described herein. In some cases, the LiDAR system 100 may aggregate return signal data for at least a threshold number of time periods where the apparatus 302 changes direction (e.g., turns) in a particular direction. As an example, return signal data aggregated from at least 50 samples acquired while the apparatus 302 is turning may be preferred to identify changes in position and/or orientation of a LiDAR device 102. In some cases, the LiDAR system 100 may aggregate return signal data for at least a threshold number of left turns and a threshold number of right turns. For example, the LiDAR system 100 may aggregate return signal data where the apparatus 302 travels within a particular range of turning radiuses above a threshold distance for at least one left turn and at least one right turn, such that fiducial markers may be identified while the apparatus changes direction in different directions. In some embodiments, to detect changes in a position or orientation of a particular LiDAR device 102, the LiDAR system 100 may not use return signal data corresponding to time periods where invalid return signal data is aggregated. Return signal data may be identified as invalid return signal data if the return signal data is aggregated during a time period where the apparatus 302 travels in a linear path or a time period where the turning radius of the apparatus 302 is misrepresented. As an example, the turning radius of the apparatus 302 may be misrepresented if one or more of the wheels of the apparatus slips during a turn. Wheel slippage may be detected based on the differential wheel speed of the apparatus's wheels.

In some embodiments, using object detection and/or environment perception techniques (see above), the LiDAR system 100 may identify one or more fiducial markers (e.g., standard or known fiducial markers) in the environment based on the point cloud(s) generated from the return signal data. The LiDAR system 100 may identify and compare the size and/or shape of each of the identified fiducial markers to the size/shape of corresponding reference fiducial markers. In some cases, the LiDAR system 100 may identify one or more different fiducial markers in the system's FOV that correspond to the same standardized or known fiducial marker. For example, the LiDAR system 100 may identify more than one lane marker in return signal data, which may each be compared to a reference representation of the lane marker to identify changes in the position or orientation of a particular LiDAR device 102.

In some embodiments, the LiDAR system 100 may identify a difference (e.g., distortion) between an identified fiducial marker and a corresponding reference fiducial marker. For example, the LiDAR system 100 may identify a difference in a width of a street sign identified during a time period where the apparatus 302 was turning and a time period where the apparatus 302 was stationary or was traveling in an approximately straight line. As an example, an identified fiducial marker may be identified as wider and/or longer than a reference fiducial marker if one or more extrinsic parameters are miscalibrated. In some cases, based on identifying a difference between an identified fiducial marker and the reference fiducial marker, the LiDAR system 100 may identify a type and a magnitude of distortion of the fiducial marker. Types of distortion may include horizontal distortion, vertical distortion, dimension distortion (e.g., length distortion, width distortion, height distortion, etc.) range/distance distortion, image blur (or "blur"), etc. A magnitude of distortion may be determined based on the difference between the size/shape of the identified fiducial marker and the reference fiducial marker. In some cases, the LiDAR system 100 may determine an average magnitude of distortion using the aggregated return signal data.

Based on the existence and/or characteristics (e.g., type and magnitude (e.g., average magnitude)) of the distortion, the LiDAR system 100 may detect a miscalibration of one or more extrinsic parameters corresponding to the LiDAR device's position and/or orientation. Based on the existence and/or characteristics of the distortion, the LiDAR system 100 may initiate remedial action. For example, the LiDAR system may generate an alert and may output the alert to a user and/or to an external computing system (e.g., system 1000) coupled to the LiDAR system 100. The alert may indicate that one or more of the extrinsic parameters are mis-calibrated, that at least one LiDAR device 102 has a changed position and/or orientation, that the LiDAR system 100 is compensating for the miscalibration of the one or more extrinsic parameters, that a user and/or an external system (e.g., system 1000) should not use the LiDAR system 100 (and its detected environment data), etc. If the magnitude of a distortion of an identified fiducial marker is greater than a first threshold and the LiDAR system 100 can compensate (e.g., sufficiently compensate) for the distortion, the LiDAR system 100 may generate an alert that the LiDAR system 100 is applying compensation to account for the mis-calibration of the one or more extrinsic parameters. If the magnitude of a distortion of an identified fiducial marker is greater than a second threshold (e.g., a second threshold greater than the first threshold) (indicating, for example, that the LiDAR system 100 may be unable to compensate (e.g., sufficiently compensate) for the distortion), the LiDAR system 100 may generate an alert recommending recalibration of the LiDAR device(s) and/or recommending that a user or an external system (e.g., system 1000) not use the LiDAR system 100 (and its detected environment data) until the LiDAR system has been recalibrated. In some cases, the LiDAR system 100 may deactivate the mis-calibrated LiDAR device(s), which may result in a reduction of the LiDAR system's field of view and/or scanning resolution.

In some cases, the LiDAR system 100 (or software coupled to the LiDAR system) may initiate remedial action to compensate for the miscalibration of the extrinsic parameters. For example, the LiDAR system may estimate the errors introduced into the positions of one or more points in the point cloud by the parameter mis-calibration, and postprocess the point cloud to compensate for those errors. For example, if the estimated error in the point's position exceeds a first error threshold E1, the LiDAR system may adjust the point's position to reduce the error or assign a lower confidence value to the point. If the estimated error in the point's position exceeds a second error threshold E2 (e.g., E2>E1), the LiDAR system may discard the point. As another example, for a LiDAR system 100 included in an autonomous vehicle application, tools (e.g., software tools) that control collision avoidance and/or lane following may compensate for the inaccurate return signal data (e.g., by reducing the vehicle's speed, alerting a driver that the performance of the autonomous vehicle software is impaired, and/or deactivating the autonomous vehicle software). In some cases, compensation for the miscalibration of one or more extrinsic parameters may involve reducing or changing the FOV of the LiDAR system 100. As an example, based on a change to a yaw of a LiDAR device 102, the LiDAR system 100 may experience an increased FOV in the direction corresponding to the change in yaw and a reduced FOV in the direction opposite to the change in yaw.

Method for Dynamic Detection of Extrinsic Parameter Miscalibration

Having described detection of changes in a position or an orientation of a particular LiDAR device 102 included in a LiDAR system, a method of dynamically detecting and/or remediating miscalibrated extrinsic parameters for a LiDAR device 102 will now be described. As described herein, during operation of a LiDAR device 102, the device's position and/or orientation relative to its operating environment 300 and associated system (e.g., apparatus 302) may shift. The device's position and/or orientation may shift due to external factors, including bumps, shocks, and vibrations, as well as due to deformations to an apparatus 302 that includes the LiDAR system 100. Generally, such changes to the device's position or orientation introduce distortions into the point cloud generated by the LiDAR system until the device undergoes recalibration of extrinsic parameters that were initially calibrated based on the LiDAR device's relationship with environment factors. Accordingly, there is a need for techniques for detecting miscalibration of a LiDAR device's extrinsic parameters. In addition, there is a need for techniques for remediating the such miscalibration.

Referring to FIG. 5, a flow chart of a method 500 for dynamic detection of extrinsic parameter miscalibration is shown, in accordance with some embodiments. For simplicity, the following paragraphs describe the method 500 with reference to a single LiDAR device/channel 102 of the LiDAR system 100. However, one of ordinary skill in the art will appreciate that the steps 510-560 of the method 500 may be performed for a combination of two or more LiDAR devices 102 of the LiDAR system 100 if two or more LiDAR devices 102 scan the FOV to generate point measurements (e.g., to detect fiducial markers) of the surrounding environment. The method 500 may be performed during operation of the LiDAR system 100 while the LiDAR system 100 is in motion (e.g., mounted to a travelling apparatus 302), such that fiducial markers may be identified during normal operation of each LiDAR device 102 as the LiDAR system scans the FOV. As an example, a LiDAR system 100 integrated with a vehicle may perform the steps of the method 500 during normal operation of the vehicle (e.g., to travel to a destination).

In some embodiments, the method 500 involves (1) scanning, via one or more LiDAR devices 102, a field-of-view (FOV) in the operating environment 300 during one or more time periods, (2) aggregating return signal data corresponding to the one or more time periods (e.g., such that the aggregated return signal data exceeds a return signal data threshold), (3) identifying one or more fiducial markers in the aggregated return signal data. (4) comparing the identified fiducial markers to corresponding reference fiducial markers, and (5) identifying distortion (if present) for the identified fiducial markers relative to the corresponding reference fiducial markers. In some embodiments, the method 500 further involves characterizing the identified distortion in a fiducial marker (e.g., determining a type and magnitude of the distortion) and/or remediating the identified miscalibration.

Referring to FIG. 5, at step 510 of the method 500, one or more LiDAR devices 102 of a LiDAR system 100 may scan a FOV of an operating environment 300 during one or more time periods. As described herein, the one or more time periods may correspond to time periods where the LiDAR system 100 and/or the corresponding apparatus 302 is turning and/or changing direction in a particular direction (e.g., left or right) within a particular range of turning radiuses for at a least threshold distance. To scan the FOV of the operating environment, the LiDAR system 100 may cause one or more transmitters 104 of one or more LiDAR devices 102 to generate and emit optical signals (110, 306), and receivers 106 corresponding to each of the LiDAR devices 102 may receive and detect return signals 114 reflecting from objects 112 in the surrounding environment. The LiDAR system 100 may scan the FOV (e.g., to the full extent of the FOV in both the horizontal and vertical directions) to generate one or more 3D point cloud representations of the operating environment 300. The one or more 3D point cloud representations may include representations of one or more fiducial markers as described herein.

At step 520, the LiDAR system 100 may determine whether a return signal data threshold for detecting miscalibration of extrinsic LiDAR parameters has been met (or exceeded). As described herein, return signal data for detecting and/or remediating miscalibrated extrinsic LiDAR parameters may correspond to return signal data obtained during time periods where the LiDAR system 100 and/or the corresponding apparatus 302 is turning and/or changing direction in a particular direction (e.g., left or right) within a particular range of turning radiuses (e.g., for at least a threshold distance). In some cases, return signal data may correspond to return signal data obtained during time periods where the LiDAR system 100 is stationary and where identified fiducial markers are in motion. As described herein, at least 50 samples of return signal data corresponding to the apparatus 302 turning and/or changing direction at a particular turning radius (or within a particular range of turning radiuses) may be preferred. A return signal data threshold may indicate the particular direction and/or the range or threshold of turning radiuses that the apparatus 302 travels where obtained return signal data may be aggregated and used for detecting miscalibration of extrinsic LiDAR parameters. If the LiDAR system 100 determines the return signal data threshold is met or exceeded, the LiDAR system 100 may proceed to step 530. If the LiDAR system 100 determines the return signal data threshold is not met, the LiDAR system 100 may revert to step 510 as described herein.

At step 530, the LiDAR system 100 may aggregate return signal data corresponding to the one or more time periods. The return signal data may include return signal intensity, location, and temporal data, which may be used to generate 3D (or a combination of 2D) point cloud measurements of one or more fields of view of the operating environment 300 for the LiDAR system 100. In some cases, the point cloud measurements may include point cloud representations of standardized and/or known fiducial markers, which may be used to detect changes in a position and/or an orientation of a particular LiDAR device 102 included in the LiDAR system 100. Based on the return signal data threshold as described herein with respect to step 520, the return signal data may have been obtained during time periods where the LiDAR system 100 and/or the corresponding apparatus 302 turned and/or changed direction in a particular direction (e.g., left or right) within a particular range of turning radiuses for at least a threshold distance. In some embodiments, the aggregation of return signal data into one or more point clouds may occur during the scanning of the FOV, such that the LiDAR system proceeds directly from step 520 to step 540 when the return signal data threshold is met.

At step 540, the LiDAR system 100 may identify one or more fiducial markers represented by the point cloud measurements of the return signal data. Such fiducial markers may be identified, for example, by applying object detection or environment perception techniques to the return signal data (e.g., including those described with respect to "LiDAR-based Object Detection"). As described herein, fiducial markers may include standardized and/or known fiducial markers, where the LiDAR system 100 includes stored reference representations of the standardized and/or known fiducial markers. In some cases, the LiDAR system 100 may identify common fiducial markers between different point cloud measurements of the operating environment, which may each be considered the same fiducial marker for comparison purposes as described below.

At step 550, the LiDAR system 100 may compare each identified fiducial marker to a corresponding reference fiducial marker. The LiDAR system 100 may compare a shape and/or size of each identified fiducial marker to a shape and/or size of the corresponding reference fiducial markers. The reference fiducial markers may have a particular shape and/or size such that changes to a position and/or an orientation of a particular LiDAR device 102 may be identified if there is a difference between the shape and/or size of an identified fiducial marker and the shape and/or size of a corresponding reference fiducial marker. In some cases, a plurality of fiducial markers may each be compared to the same reference fiducial markers. For example, for return signal data that include point cloud representations of a plurality of lane markers, the LiDAR system 100 may compare each identified lane marker to a reference representation of the lane marker stored by the LiDAR system 100.

At step 560, the LiDAR system 100 may identify a type and a magnitude of distortion of an identified fiducial marker relative to a corresponding reference fiducial marker. Distortion of a particular identified fiducial marker may be represented by blurring of the identified fiducial marker relative to a reference fiducial marker. A type of distortion may correspond to a change in one or more particular degrees of freedom of a position and/or an orientation of a LiDAR device 102. In some cases, the magnitude of distortion between an identified fiducial marker and a corresponding reference fiducial marker may correspond to a magnitude of a change in position and/or orientation of a particular LiDAR device 102. The magnitude of distortion may be determined based on differences between the visual attributes (e.g., size, shape, etc.) of the identified fiducial markers and the reference fiducial markers. The magnitude of distortion may be represented by a difference in the size (e.g., length, width, height, etc.) and/or shape of the identified fiducial marker and the corresponding reference fiducial marker. In other cases, the magnitude of distortion between an identified fiducial marker and a corresponding reference fiducial marker may be represented by a ratio of the size (e.g., length, width, height, etc.) and/or shape of the identified fiducial marker and the corresponding reference fiducial marker.

In some embodiments, the LiDAR system 100 detects miscalibration of one or more extrinsic parameters if the magnitude of distortion of any identified fiducial marker exceeds a distortion threshold. On the other hand, if the magnitude of distortion of each identified fiducial marker is below the distortion threshold, the distortions may be disregarded or treated as negligible, such that miscalibration of extrinsic parameters is not detected.

For identified fiducial markers that are each compared to a same reference fiducial marker, the LiDAR system 100 may determine an average type and average magnitude of distortion (e.g., blur) for that particular identified fiducial marker. As an example, for an identified fiducial marker corresponding to a lane marking, the LiDAR system 100 may identify the identified lane marking as blurred relative to a stored representation of a lane marking (e.g., reference fiducial marker), such that the identified lane marking is wider (e.g., due to blurring) than the stored representation of the lane marker. The difference in width (or a ratio of the widths) between the identified lane marker and the stored representation of the lane marker may be determined to be the magnitude of distortion for the identified fiducial marker.

At step 570, the LiDAR system 100 may remediate the detected miscalibration of one or extrinsic parameters of one or more LiDAR devices 102. The LiDAR system 100 may input the identified type(s) and magnitude(s) of distortion (e.g., non-negligible distortion) to a compensation algorithm to determine one or remedial actions to initiate. As described herein, the extrinsic parameters may be indicative of a particular LiDAR device's position and/or orientation relative to the x-, y-, and z-axes. In some cases, the LiDAR system 100 may determine a magnitude of an adjustment to one or more extrinsic parameters based on the identified magnitude(s) of distortion for a combination of the identified fiducial markers. In some cases, the LiDAR system 100 may determine which of the extrinsic parameters to adjust based on the type(s) of distortion for a combination of the identified fiducial markers. For example, for a plurality of identified lane markers having an average type and magnitude of distortion, the LiDAR system 100 may use the average type and magnitude of distortion determined from the plurality of identified lane markers to determine which of the one or more extrinsic parameters to adjust and the corresponding magnitude(s) for the adjustment.

The remedial action(s) may account (e.g., compensate) for the changed position and/or orientation of at least one LiDAR device 102, such that decisioning of the LiDAR system 100 (or a coupled external system) based on environmental point cloud data may be maintained and/or otherwise improved relative to decisioning performed without the remedial action(s). In some cases, the LiDAR system 100 may generate an alert as described herein based on type(s) and magnitude(s) of distortion for identified fiducial markers, where the alert may be output to a user (e.g., of the LiDAR system 100 and/or apparatus 302) and/or output to an external computing system (e.g., system 1000) coupled to the LiDAR system 100. Other types of remedial actions may be initiated, as described above.

Some Examples of Continuous Wave (CW) LiDAR Systems

As discussed above, some LiDAR systems may use a continuous wave (CW) laser to detect the range and/or velocity of targets, rather than pulsed TOF techniques. Such systems include frequency modulated continuous wave (FMCW) coherent LiDAR systems. For example, any of the LiDAR systems 100, 202, 250, and 270 described above can be configured to operate as an FMCW coherent LiDAR system.

Figure 6:
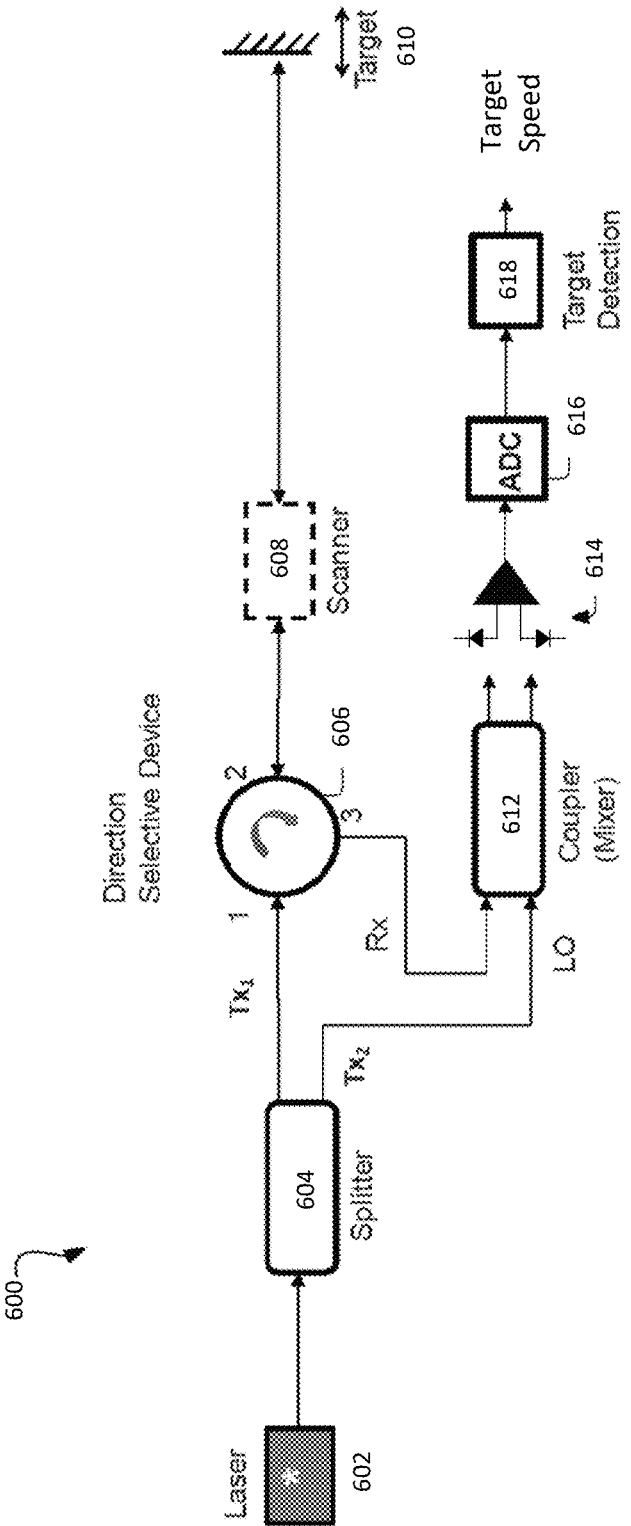
FIG. 6 is an illustration of an example frequency modulated continuous wave (FMCW) coherent LiDAR system.

FIG. 6 illustrates an exemplary FMCW coherent LiDAR system 600 configured to determine the radial velocity of a target. LiDAR system 600 includes a laser 602 configured to produce a laser signal which is provided to a splitter 604. The laser 602 may provide a laser signal having a substantially constant laser frequency.

In one example, a splitter 604 provides a first split laser signal Tx1 to a direction selective device 606, which provides (e.g., forwards) the signal Tx1 to a scanner 608. In some examples, the direction selective device 606 is a circulator. The scanner 608 uses the first laser signal Tx1 to transmit light emitted by the laser 602 and receives light reflected by the target 610 (e.g., "reflected light" or "reflections"). The reflected light signal Rx is provided (e.g., passed back) to the direction selective device 606. The second laser signal Tx2 and reflected light signal Rx are provided to a coupler (also referred to as a mixer) 612. The mixer may use the second laser signal Tx2 as a local oscillator (LO) signal and mix it with the reflected light signal Rx. The mixer 612 may be configured to mix the reflected light signal Rx with the local oscillator signal LO to generate a beat frequency $f_{beat}$ when detected by a differential photodetector 614. The beat frequency $f_{beat}$ from the differential photodetector 614 output is configured to produce a current based on the received light. The current may be converted to voltage by an amplifier (e.g., transimpedance amplifier (TIA)), which may be provided (e.g., fed) to an analog-to-digital converter (ADC) 616 configured to convert the analog voltage signal to digital samples for a target detection module 618. The target detection module 618 may be configured to determine (e.g., calculate) the radial velocity of the target 610 based on the digital sampled signal with beat frequency $f_{beat}$.

In one example, the target detection module 618 may identify Doppler frequency shifts using the beat frequency $f_{beat}$ and determine the radial velocity of the target 610 based on those shifts. For example, the velocity of the target 610 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 610. In some examples, the direction of the target 610 is indicated by the sign of the Doppler frequency shift $f_d$. For example, a positive signed Doppler frequency shift may indicate that the target 610 is traveling towards the system 600 and a negative signed Doppler frequency shift may indicate that the target 610 is traveling away from the system 600.

In one example, a Fourier Transform calculation is performed using the digital samples from the ADC 616 to recover the desired frequency content (e.g., the Doppler frequency shift) from the digital sampled signal. For example, a controller (e.g., target detection module 618) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the LiDAR system 600 is described above as being configured to determine the radial velocity of a target, it should be appreciated that the system can be configured to determine the range and/or radial velocity of a target. For example, the LIDAR system 600 can be modified to use laser chirps to detect the velocity and/or range of a target.

Figure 7:
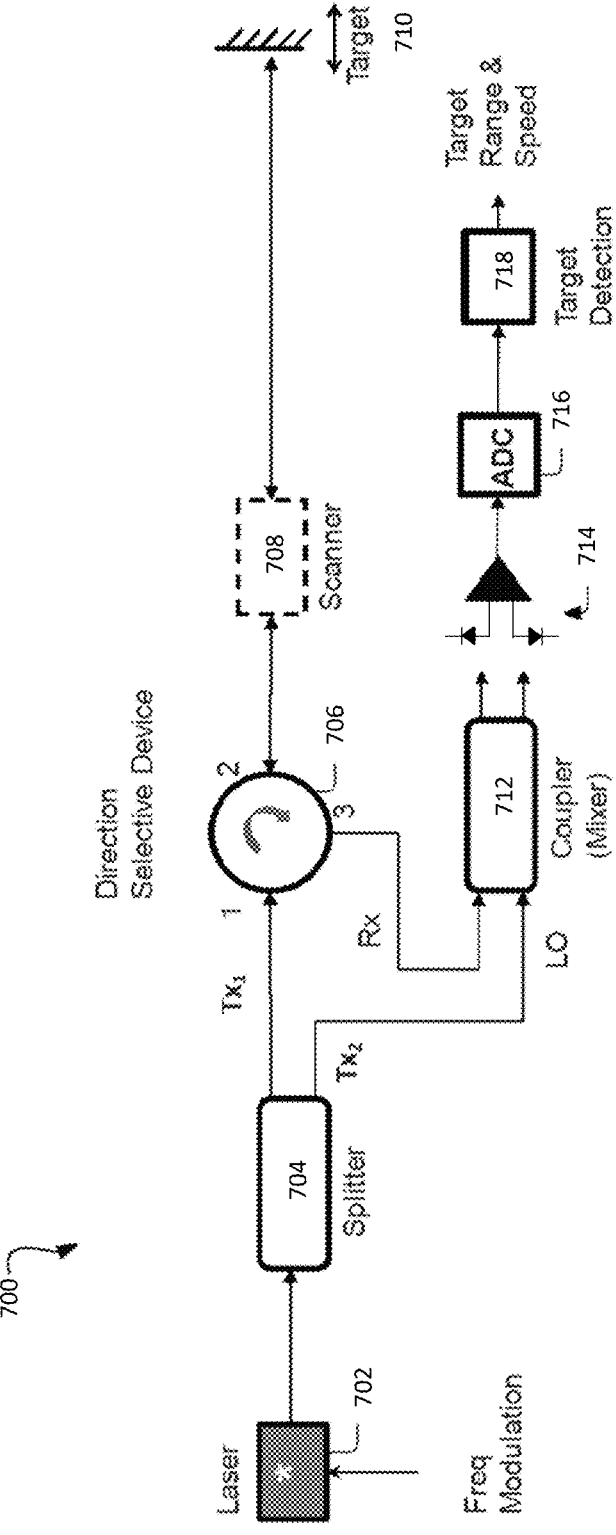
FIG. 7 is an illustration of another example FMCW coherent LiDAR system.

FIG. 7 illustrates an exemplary FMCW coherent LiDAR system 700 configured to determine the range and/or radial velocity of a target. LiDAR system 700 includes a laser 702 configured to produce a laser signal which is fed into a splitter 704. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 702; however, in other examples, an external modulator can be placed between the laser source 702 and the splitter 704.

In other examples, the laser frequency can be "chirped" by modulating the phase of the laser signal (or light) produced by the laser 702. In one example, the phase of the laser signal is modulated using an external modulator placed between the laser source 702 and the splitter 704; however, in some examples, the laser source 702 may be modulated directly by changing operating parameters (e.g., current/voltage) or include an internal modulator. Similar to frequency chirping, the phase of the laser signal can be increased ("ramped up") or decreased ("ramped down") over time.

Some examples of systems with FMCW-based LiDAR sensors have been described. However, the techniques described herein may be implemented using any suitable type of LiDAR sensors including, without limitation, any suitable type of coherent LiDAR sensors (e.g., phase-modulated coherent LiDAR sensors). With phase-modulated coherent LiDAR sensors, rather than chirping the frequency of the light produced by the laser (as described above with reference to FMCW techniques), the LiDAR system may use a phase modulator placed between the laser 702 and the splitter 704 to generate a discrete phase modulated signal, which may be used to measure range and radial velocity.

As shown, the splitter 704 provides a first split laser signal Tx1 to a direction selective device 706, which provides (e.g., forwards) the signal Tx1 to a scanner 708. The scanner 708 uses the first laser signal Tx1 to transmit light emitted by the laser 702 and receives light reflected by the target 710. The reflected light signal Rx is provided (e.g., passed back) to the direction selective device 706. The second laser signal Tx2 and reflected light signal Rx are provided to a coupler (also referred to as a mixer) 712. The mixer may use the second laser signal Tx2 as a local oscillator (LO) signal and mix it with the reflected light signal Rx. The mixer 712 may be configured to mix the reflected light signal Rx with the local oscillator signal LO to generate a beat frequency $f_{beat}$. The mixed signal with beat frequency $f_{beat}$ may be provided to a differential photodetector 714 configured to produce a current based on the received light. The current may be converted to voltage by an amplifier (e.g., a transimpedance amplifier (TIA)), which may be provided (e.g., fed) to an analog-to-digital converter (ADC) 716 configured to convert the analog voltage to digital samples for a target detection module 718. The target detection module 718 may be configured to determine (e.g., calculate) the range and/or radial velocity of the target 710 based on the digital sampled signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{ (given a perfectly linear chirp), and}$$

$$\text{Range: } R = \frac{f_{beat} c T_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

Figures 8A, 8B:
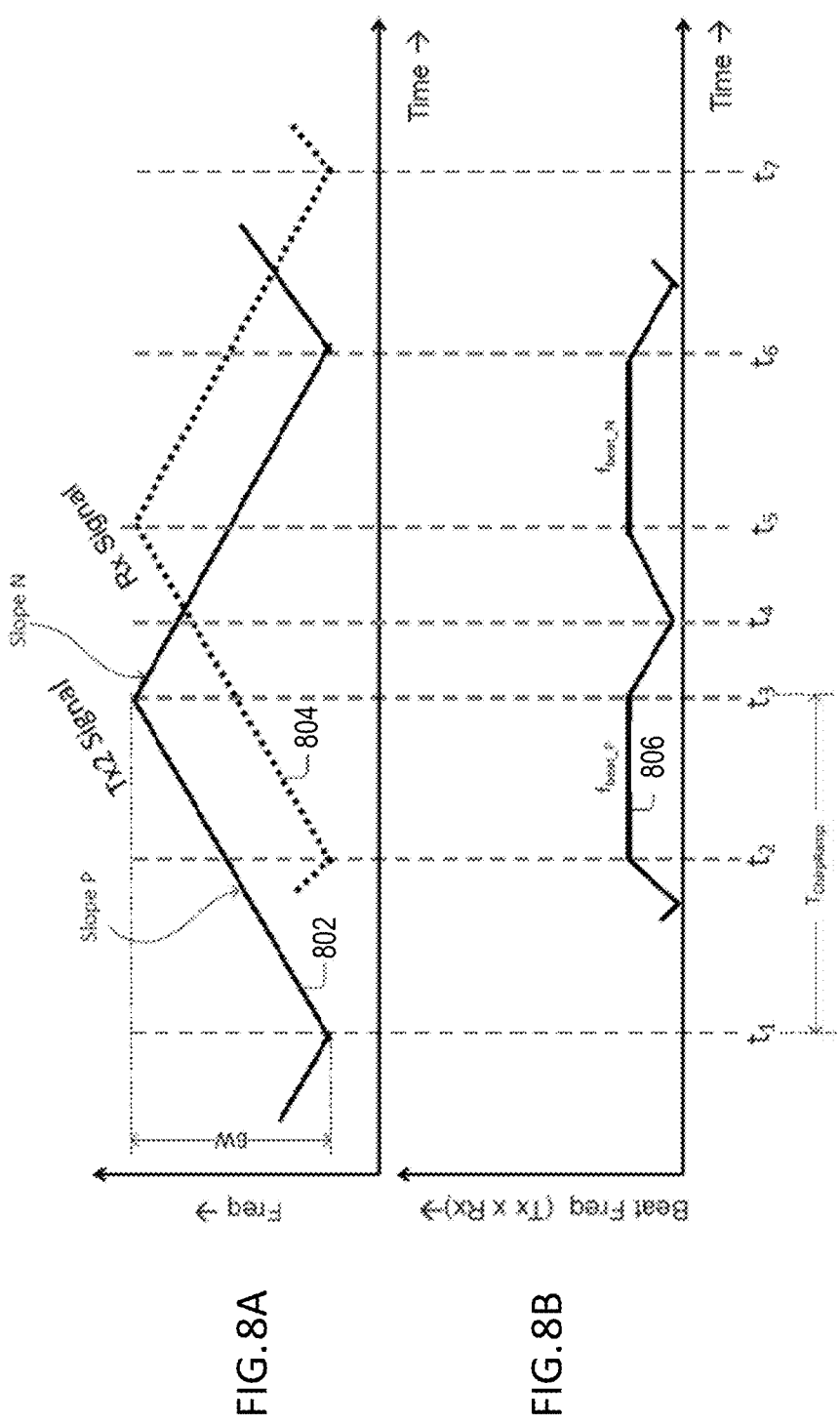
FIG. 8A is a plot of a frequency chirp as a function of time in a transmitted laser signal and reflected signal.
FIG. 8B is a plot illustrating a beat frequency of a mixed signal.

FIG. 8A is a plot of ideal (or desired) frequency chirp as a function of time in the transmitted laser signal Tx (e.g., signal Tx2), depicted in solid line 802, and reflected light signal Rx, depicted in dotted line 804. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 8B is a plot illustrating the corresponding ideal beat frequency $f_{beat}$ 806 of the mixed signal Tx2×Rx. Note that the beat frequency $f_{beat}$ 806 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 8A-8B, when the positive and negative ramp pair is used to measure range and velocity simultaneously, the following relationships are utilized:

$$\text{Range: } R = \frac{cT_{ChirpRamp}\frac{(f_{beat\_P} + f_{beat\_N})}{2}}{2BW}, \text{ and}$$

$$\text{Velocity: } V = \frac{\lambda\frac{(f_{beat\_P} - f_{beat\_N})}{2}}{2}$$

where $f_{beat\_P}$ and $f_{beat\_N}$ are beat frequencies generated during positive (P) and negative (N) slopes of the chirp 802 respectively and $\lambda$ is the wavelength of the laser signal.

In one example, the scanner 708 of the LiDAR system 700 is used to scan the environment and generate a target point cloud from the acquired scan data. In some examples, the LiDAR system 700 can use processing methods that include performing one or more Fourier Transform calculations, such as a Fast Fourier Transform (FFT) or a Discrete Fourier Transform (DFT), to generate the target point cloud from the acquired scan data. Being that the system 700 is capable of measuring range, each point in the point cloud may have a three-dimensional location (e.g., x, y, and z) in addition to radial velocity. In some examples, the x-y location of each target point corresponds to a radial position of the target point relative to the scanner 708. Likewise, the z location of each target point corresponds to the distance between the target point and the scanner 708 (e.g., the range). In one example, each target point corresponds to one frequency chirp 802 in the laser signal. For example, the samples collected by the system 700 during the chirp 802 (e.g., t1 to t6) can be processed to generate one point in the point cloud.

Some Examples of Computing Devices and Information Handling Systems

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price.

Figure 9:
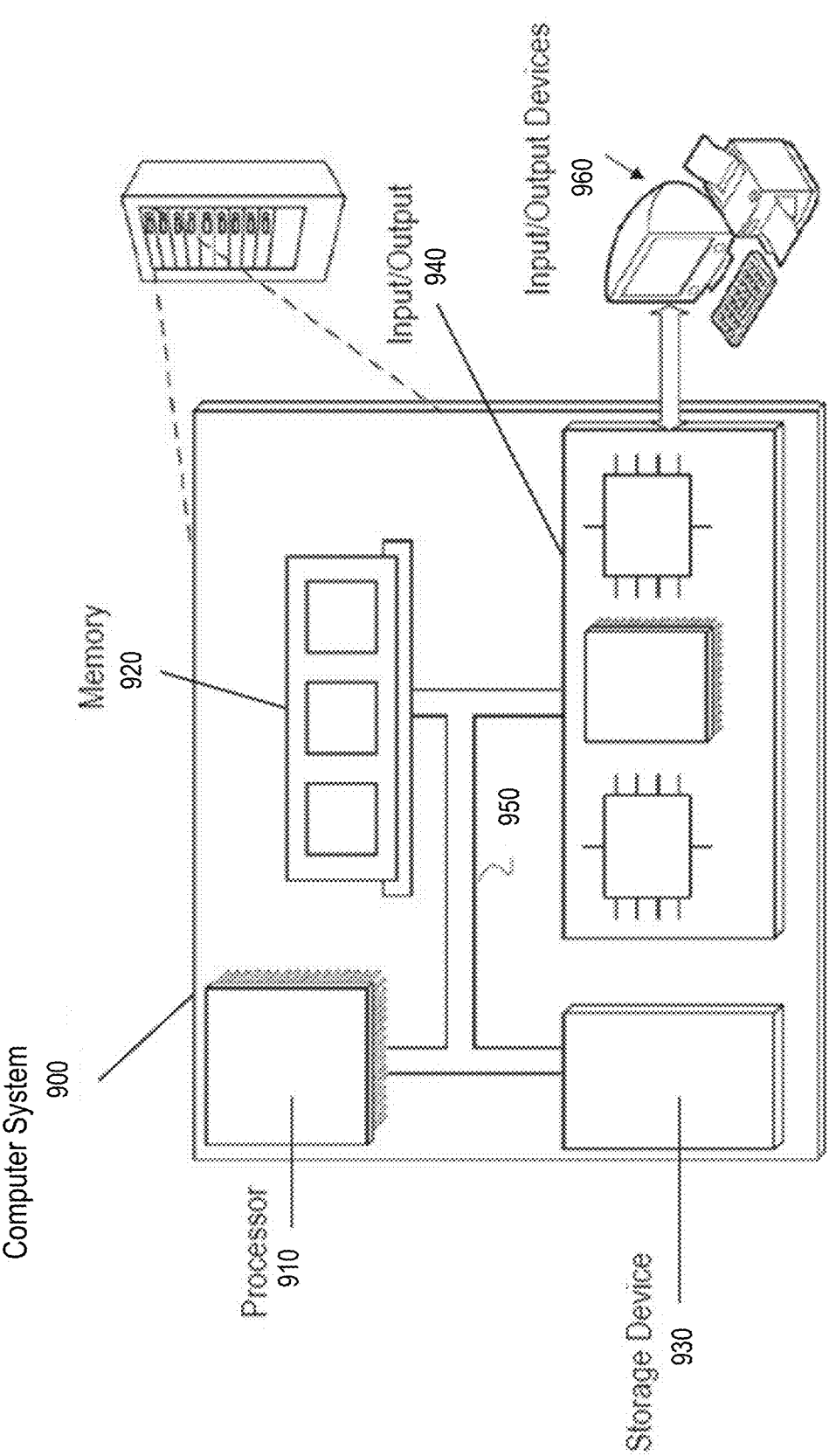
FIG. 9 shows a block diagram of a computing device/information handling system, in accordance with some embodiments.

FIG. 9 is a block diagram of an example computer system 900 that may be used in implementing the technology described in this document. General-purpose computers, network appliances, mobile devices, or other electronic systems may also include at least portions of the system 900. The system 900 includes a processor 910, a memory 920, a storage device 930, and an input/output device 940. Each of the components 910, 920, 930, and 940 may be interconnected, for example, using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930.

The memory 920 stores information within the system 900. In some implementations, the memory 920 is a non-transitory computer-readable medium. In some implementations, the memory 920 is a volatile memory unit. In some implementations, the memory 920 is a non-volatile memory unit.

The storage device 930 is capable of providing mass storage for the system 900. In some implementations, the storage device 930 is a non-transitory computer-readable medium. In various different implementations, the storage device 930 may include, for example, a hard disk device, an optical disk device, a solid-date drive, a flash drive, or some other large capacity storage device. For example, the storage device may store long-term data (e.g., database data, file system data, etc.). The input/output device 940 provides input/output operations for the system 900. In some implementations, the input/output device 940 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 960. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 930 may be implemented in a distributed way over a network, for example as a server farm or a set of widely distributed servers, or may be implemented in a single computing device.

Although an example processing system has been described in FIG. 9, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 10:
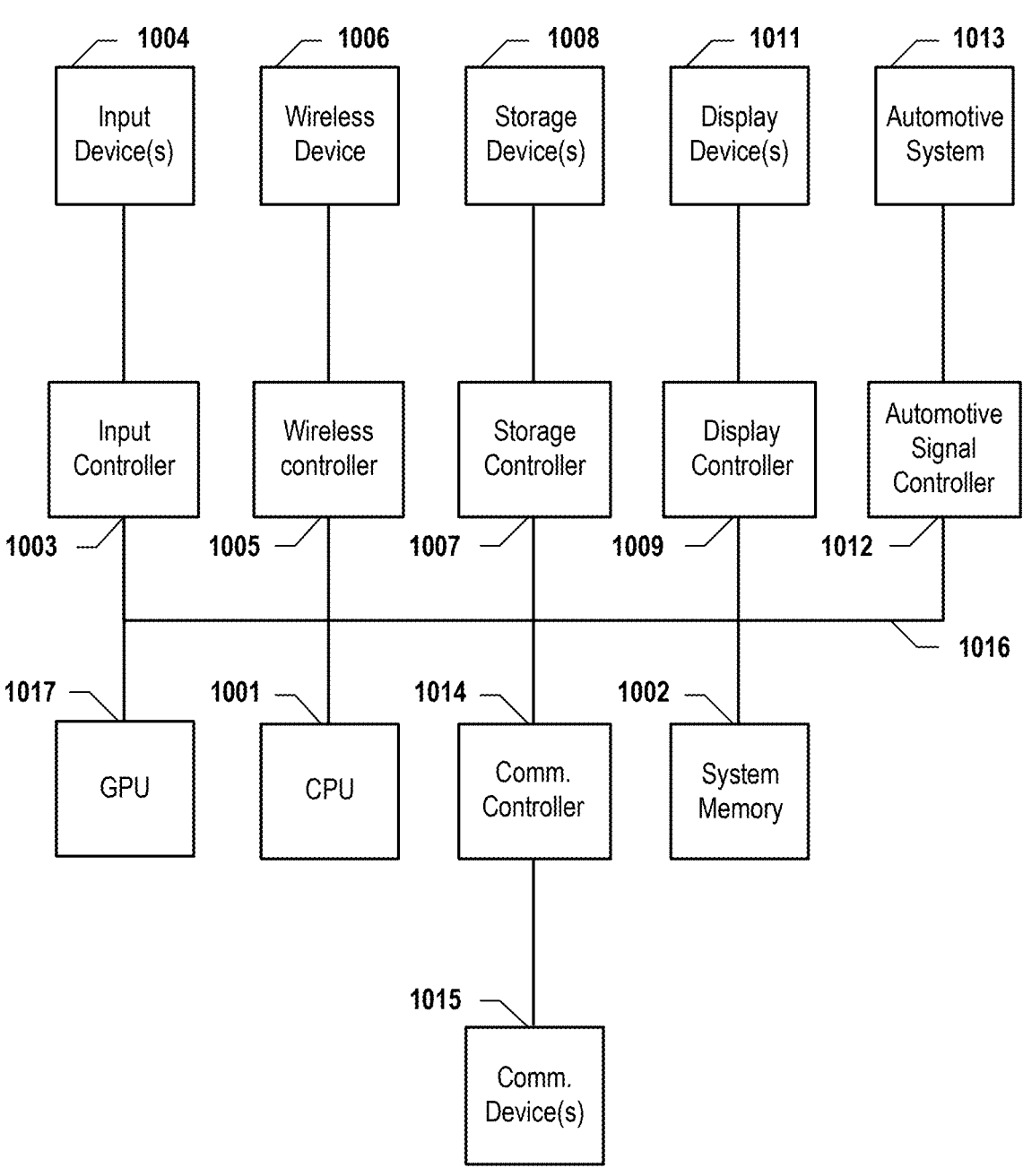
FIG. 10 is a block diagram of an example computer system.

FIG. 10 depicts a simplified block diagram of a computing device/information handling system (or computing system) according to embodiments of the present disclosure. It will be understood that the functionalities shown for system 1000 may operate to support various embodiments of an information handling system—although it shall be understood that an information handling system may be differently configured and include different components.

As illustrated in FIG. 10, system 1000 includes one or more central processing units (CPU) 1001 that provide(s) computing resources and control(s) the computer. CPU 1001 may be implemented with a microprocessor or the like, and may also include one or more graphics processing units (GPU) 1017 and/or a floating point coprocessor for mathematical computations. System 1000 may also include a system memory 1002, which may be in the form of random-access memory (RAM), read-only memory (ROM), or both.

A number of controllers and peripheral devices may also be provided. For example, an input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the techniques described herein. Storage device(s) 1008 may also be used to store processed data or data to be processed in accordance with some embodiments. System 1000 may also include a display controller 1009 for providing an interface to a display device 1011, which may be a cathode ray tube (CRT), a thin film transistor (TFT) display, or other type of display. The computing system 1000 may also include an automotive signal controller 1012 for communicating with an automotive system 1013. A communications controller 1014 may interface with one or more communication devices 1015, which enables system 1000 to connect to remote devices through any of a variety of networks including the Internet, a cloud resource (e.g., an Ethernet cloud, an Fiber Channel over Ethernet (FCOE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into submodules or combined together.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled." "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of." "only one of." or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A light detection and ranging (LiDAR) detection method comprising:

scanning, by a LiDAR system comprising one or more LiDAR devices mounted on or carried by a kinematic apparatus a field-of-view during one or more time periods, wherein the LiDAR system moves along a non-linear path during at least a subset of the one or more time periods;

receiving, from the kinematic apparatus, directional data corresponding to respective paths of the LiDAR system during each of the one or more time periods;

aggregating return signal data obtained during at least the subset of the one or more time periods;

identifying one or more fiducial markers represented by the aggregated return signal data;

comparing each of the identified fiducial markers to a respective reference fiducial marker of a plurality of reference fiducial markers;

detecting, based on the comparison, miscalibration of an extrinsic parameter associated with a position and/or an orientation of at least one of the one or more LiDAR devices; and initiating an action to remediate the detected miscalibration of the extrinsic parameter wherein aggregating the return signal data obtained during at least the subset of the one or more time periods comprises:

aggregating the return signal data for at least a threshold number of time periods;

wherein the directional data indicate the LiDAR system as changing direction within a range of turning radiuses or within a threshold turning radius during at least the subset of the one or more time periods.

2. The method of claim 1, wherein scanning, by the LiDAR system comprising the one or more LiDAR devices, the field-of-view during the one or more time periods comprises:

emitting, by one or more transmitters, one or more optical signals; and receiving, by one or more receivers, one or more return signals corresponding to the one or more optical signals, wherein each of the one or more LiDAR devices includes at least one of the one or more transmitters and at least one of the one or more receivers.

3. The method of claim 2, wherein the return signal data are derived from the one or more return signals and comprise a point cloud of measurements corresponding to the one or more optical signals.

4. The method of claim 3, wherein the return signal data comprise one or more measurements of range from the LiDAR system to one or more objects in an environment of the LiDAR system.

5. The method of claim 1, wherein the LiDAR system includes and/or accesses the plurality of reference fiducial markers and wherein the plurality of reference fiducial markers comprise data representing visual attributes of objects of standardized shapes and/or sizes.

6. The method of claim 5, wherein the objects of standardized shapes and/or sizes comprise lane markings and/or street signs.

7. The method of claim 1, wherein comparing each of the identified fiducial markers to the respective reference fiducial marker comprises:

for each of the identified fiducial markers, selecting the respective reference fiducial marker based on data representing visual attributes of the respective identified fiducial marker.

8. The method of claim 1, wherein initiating the action to remediate the detected miscalibration of the extrinsic parameter comprises:

generating an alert recommending recalibration of one or more extrinsic parameters of the LiDAR system.

9. The method of claim 1, wherein the distortion comprises a difference between a length, a width, and/or a height of the identified fiducial marker and the respective reference fiducial marker or a ratio between the length, the width, and/or the height of the identified fiducial marker and the respective reference fiducial marker.

10. The method of claim 1, wherein a type of the distortion corresponds to whether the distortion is a difference between a length, a width, and/or a height of the identified fiducial marker and the respective reference fiducial marker.

11. The method of claim 1, wherein the distortion comprises an average distortion for a subset of the one or more identified fiducial markers, wherein each identified fiducial marker in the subset of the one or more identified fiducial markers corresponds to a particular reference fiducial marker.

12. A LiDAR system comprising:

one or more LiDAR devices mounted on or carried by a kinematic apparatus and configured to scan afield-of-view during one or more time periods, wherein the LiDAR system moves along a non-linear path during at least a subset of the one or more time periods; and a processing device configured to:

receive, from the kinematic apparatus, directional data corresponding to respective paths of the LiDAR system during each of the one or more time periods;

aggregate return signal data obtained during at least the subset of the one or more time periods;

identify one or more fiducial markers represented by the aggregated return signal data;

compare each of the identified fiducial markers to a respective reference fiducial marker of a plurality of reference fiducial markers;

detect, based on the comparison, miscalibration of an extrinsic parameter associated with a position and/or an orientation of at least one of the one or more LiDAR devices; and initiate an action to remediate the detected miscalibration of the extrinsic parameter, wherein the processing device is further configured to aggregate the return signal data obtained during at least the subset of the one or more time periods by:

aggregating the return signal data for at least a threshold number of time periods;

wherein the directional data indicate the LiDAR system as changing direction within a range of turning radiuses or within a threshold turning radius during at least the subset of the one or more time periods.

13. The system of claim 12, wherein the one or more LiDAR devices are configured to scan a field-of-view during one or more time periods by:

emitting, by one or more transmitters, one or more optical signals; and receiving, by one or more receivers, one or more return signals corresponding to the one or more optical signals, wherein each of the one or more LiDAR devices includes at least one of the one or more transmitters and at least one of the one or more receivers.

14. The system of claim 13, wherein the return signal data are derived from the one or more return signals and comprise a point cloud of measurements corresponding to the one or more optical signals.

15. The system of claim 14, wherein the return signal data comprise one or more measurements of range from the LiDAR system to one or more objects in an environment of the LiDAR system.

16. The system of claim 12, wherein the processing device is configured to access the plurality of reference fiducial markers and wherein the plurality of reference fiducial markers comprise data representing visual attributes of objects of standardized shapes and/or sizes.

17. The system of claim 16, wherein the objects of standardized shapes and/or sizes comprise lane markings and/or street signs.

18. The system of claim 12, wherein the processing device is configured to compare each of the identified fiducial markers to the respective reference fiducial marker of the plurality of reference fiducial markers by:

selecting, for each of the identified fiducial markers, the respective reference fiducial marker based on data representing visual attributes of the respective identified fiducial marker.

19. The system of claim 12, wherein the processing device is configured to initiate the action to remediate the detected miscalibration of the extrinsic parameter by:

generating an alert recommending recalibration of one or more extrinsic parameters of the LiDAR system.

20. The system of claim 12, wherein the distortion comprises a difference between a length, a width, and/or a height of the identified fiducial marker and the respective reference fiducial marker or a ratio between the length, the width, and/or the height of the identified fiducial marker and the respective reference fiducial marker.

21. The system of claim 12, wherein a type of the distortion corresponds to whether the distortion is a difference between a length, a width, and/or a height of the identified fiducial marker and the respective reference fiducial marker.

22. The system of claim 12, wherein the distortion comprises an average distortion for a subset of the one or more identified fiducial markers, wherein each identified fiducial marker in the subset of the one or more identified fiducial markers corresponds to a particular reference fiducial marker.

* * * * *